(12) United States Patent
Sugita

(10) Patent No.: US 9,046,676 B2
(45) Date of Patent: Jun. 2, 2015

(54) ZOOM LENS AND IMAGE PICKUP APPARATUS HAVING THE SAME

(75) Inventor: Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/613,481

(22) Filed: Sep. 13, 2012

(65) Prior Publication Data

US 2013/0088622 A1    Apr. 11, 2013

(30) Foreign Application Priority Data

Oct. 5, 2011    (JP) .................................. 2011-220910

(51) Int. Cl.
  *G02B 27/64*  (2006.01)
  *G02B 15/14*  (2006.01)
  *G02B 13/18*  (2006.01)
  *G02B 15/173* (2006.01)

(52) U.S. Cl.
  CPC ................ *G02B 13/18* (2013.01); *G02B 15/14* (2013.01); *G02B 27/646* (2013.01); *G02B 15/173* (2013.01)

(58) Field of Classification Search
  CPC ........ G02B 15/00; G02B 15/14; G02B 15/22; G02B 27/646; G02B 27/64
  USPC .................. 359/676–688, 554–557
  See application file for complete search history.

(56) References Cited

U.S. PATENT DOCUMENTS

| | | | | |
|---|---|---|---|---|
| 6,002,527 A * | 12/1999 | Ohtake | | 359/683 |
| 6,025,962 A * | 2/2000 | Suzuki | | 359/766 |
| 6,055,114 A * | 4/2000 | Ohtake | | 359/676 |
| 6,788,464 B2 * | 9/2004 | Misaka | | 359/557 |
| 7,199,940 B2 * | 4/2007 | Obama et al. | | 359/683 |
| 7,253,965 B2 * | 8/2007 | Shibayama et al. | | 359/687 |
| 7,492,524 B2 * | 2/2009 | Ito | | 359/683 |
| 7,889,438 B2 | 2/2011 | Muramatsu | | |
| 2009/0316266 A1 * | 12/2009 | Shinohara | | 359/557 |
| 2010/0091174 A1 * | 4/2010 | Miyazaki et al. | | 348/345 |
| 2011/0091123 A1 * | 4/2011 | Fukuhara et al. | | 382/248 |
| 2011/0116174 A1 * | 5/2011 | Suzuki et al. | | 359/687 |
| 2011/0122508 A1 * | 5/2011 | Miwa et al. | | 359/687 |
| 2011/0273774 A1 * | 11/2011 | Saruwatari | | 359/554 |

FOREIGN PATENT DOCUMENTS

JP    2010-271362 A    12/2010

* cited by examiner

*Primary Examiner* — Thong Nguyen
(74) *Attorney, Agent, or Firm* — Canon USA Inc IP Division

(57) ABSTRACT

A zoom lens includes N lens units, in which a lens unit having a positive refractive power is disposed closest to an object side. Each lens unit is moved to effect zooming. An (N−1)th lens unit and an N-th lens unit, counted from the object side, have positive refractive powers. The (N−1)th lens unit includes a first lens subunit having a positive refractive power and a second lens subunit having a negative refractive power in order from the object side to an image side. The second lens subunit is moved to have a component in a direction perpendicular to an optical axis to move an image position. A focal length fN of the N-th lens unit, a back focus bkt at the telephoto end, and an amount of movement mN of the N-th lens unit during zooming from a wide-angle end to a telephoto end are appropriately set.

8 Claims, 29 Drawing Sheets

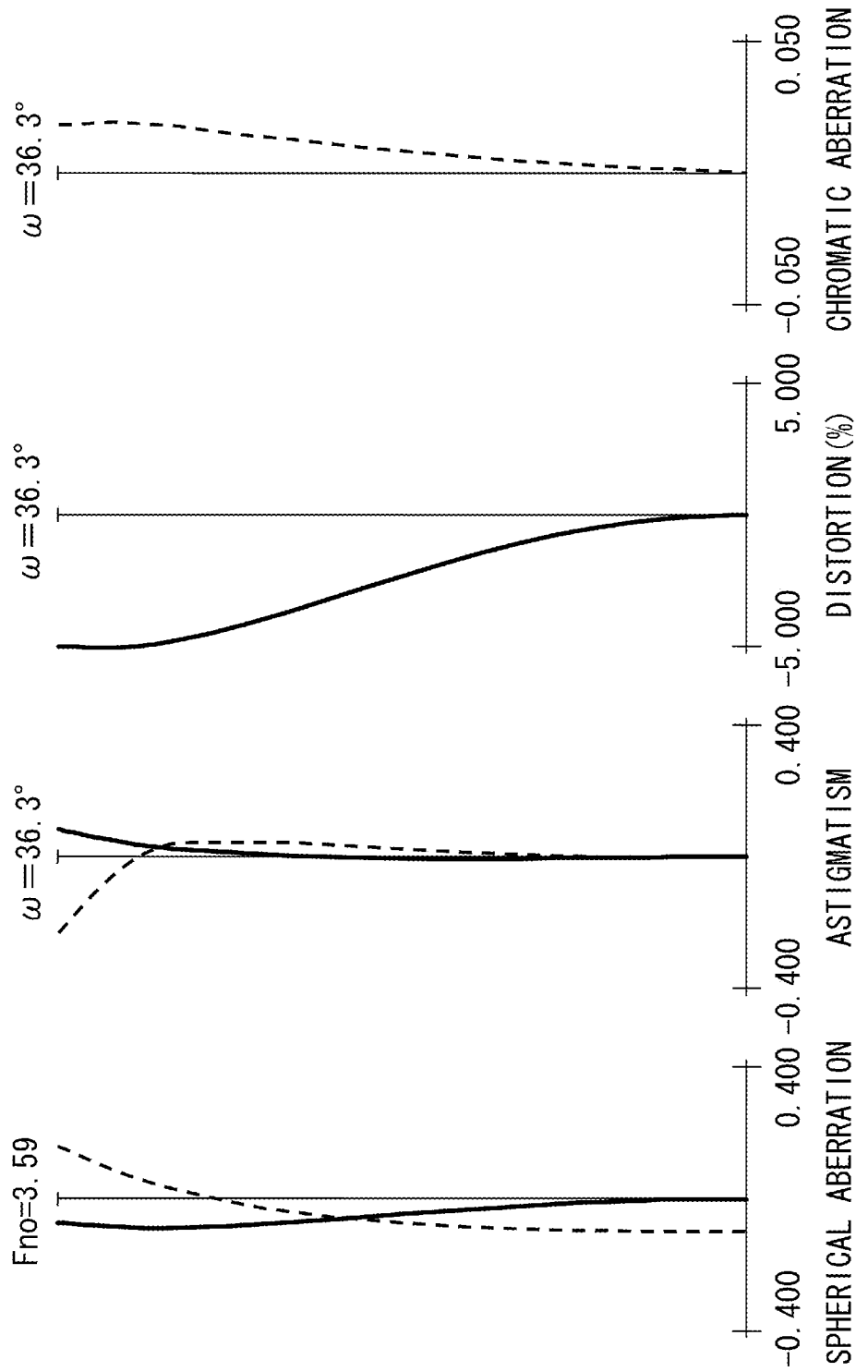

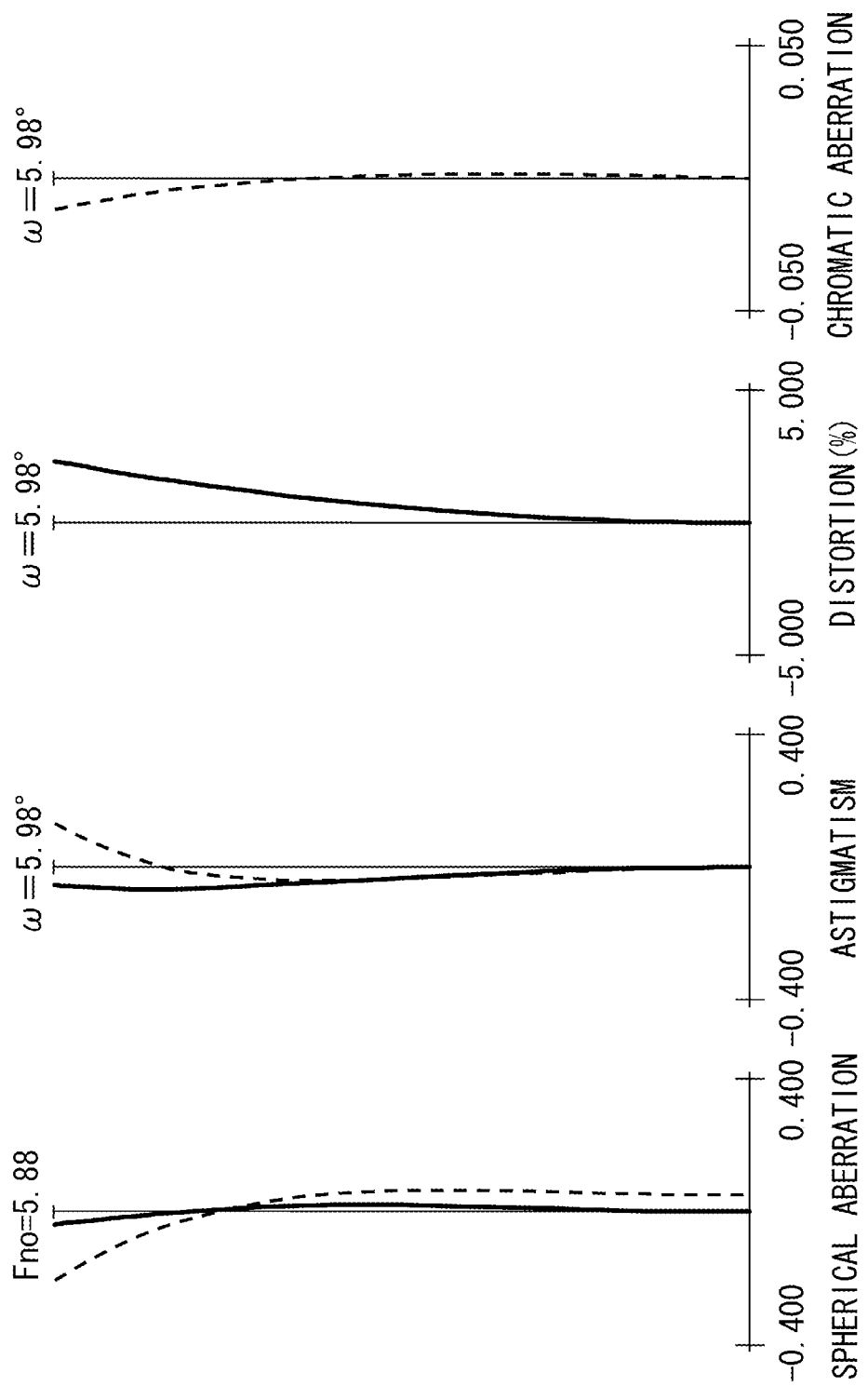

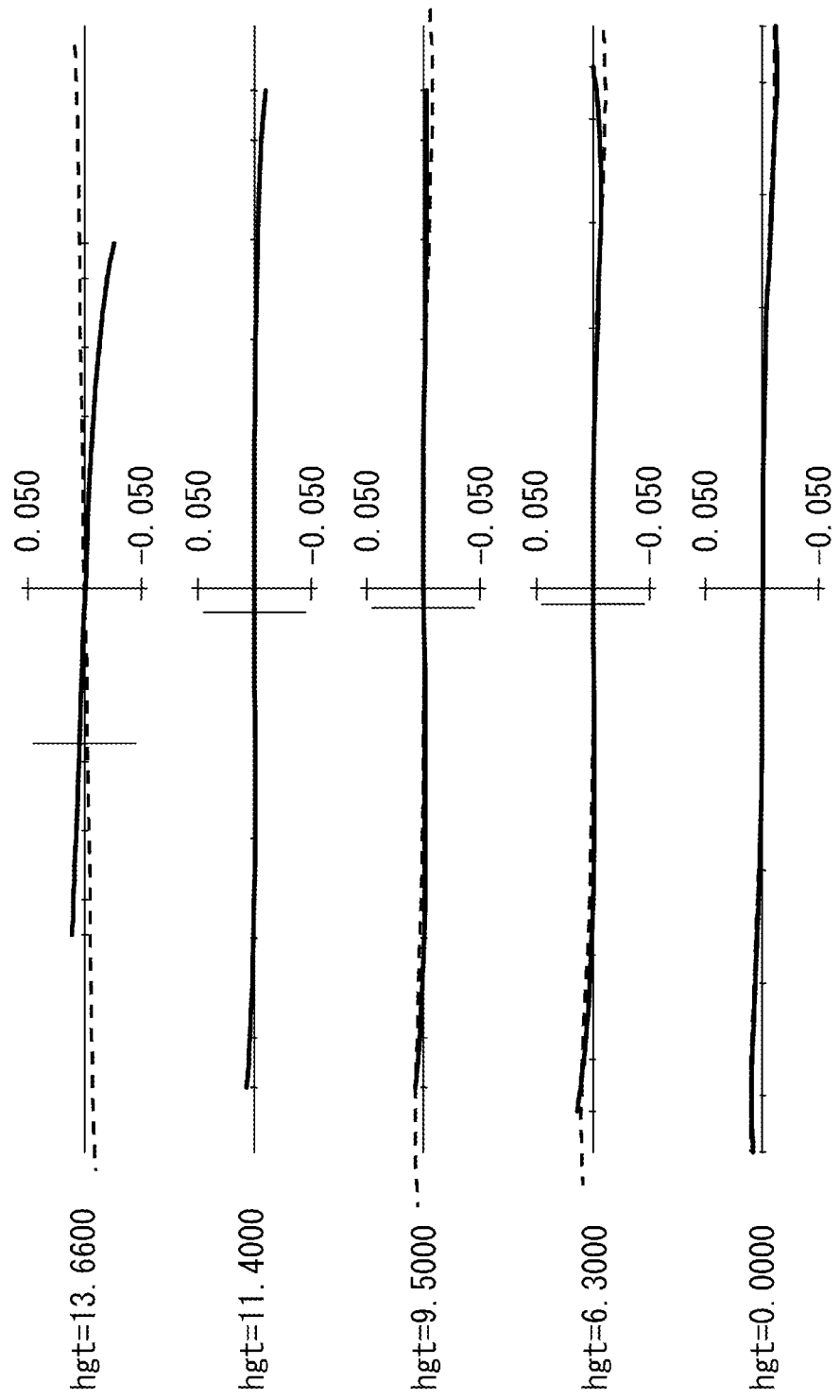

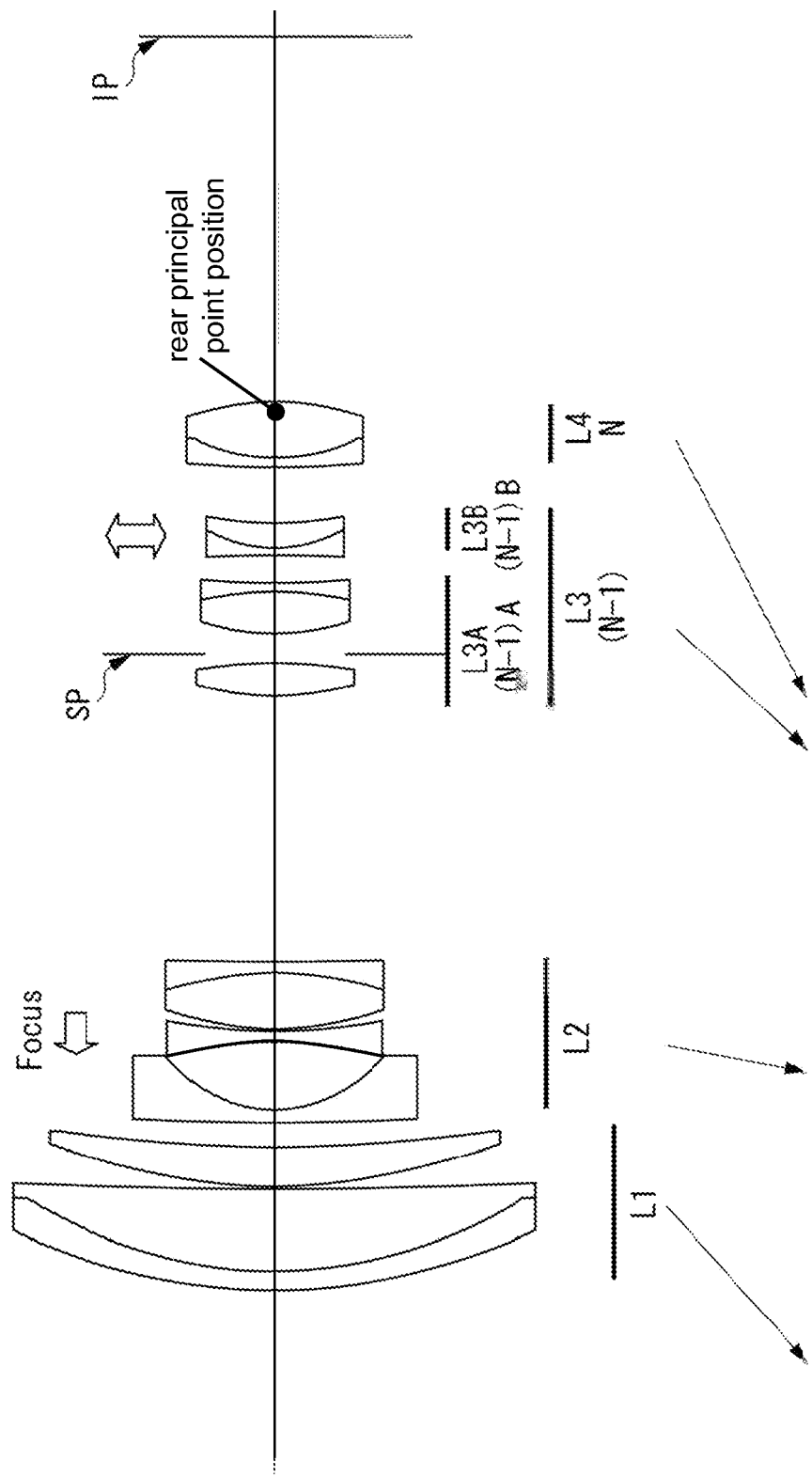

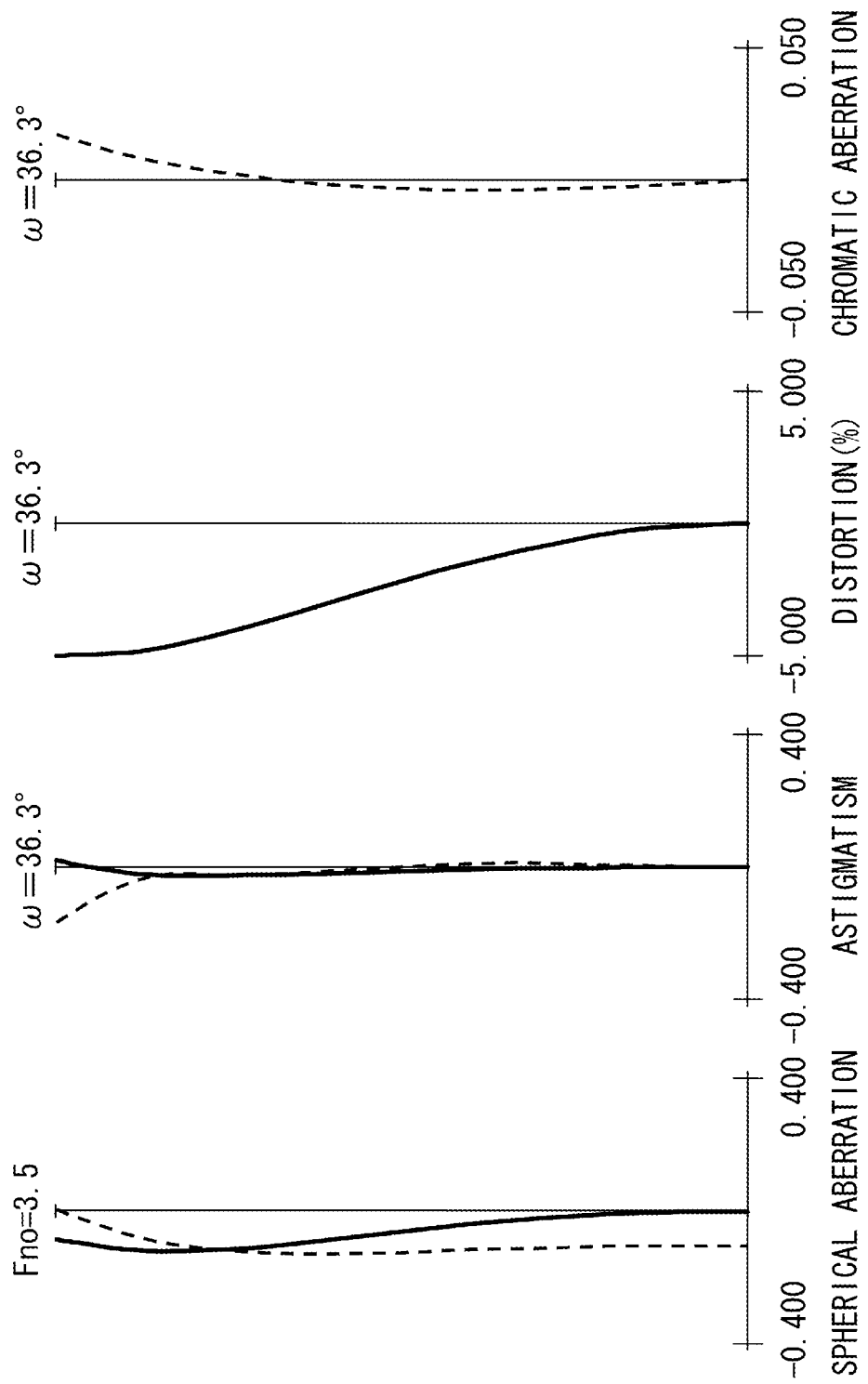

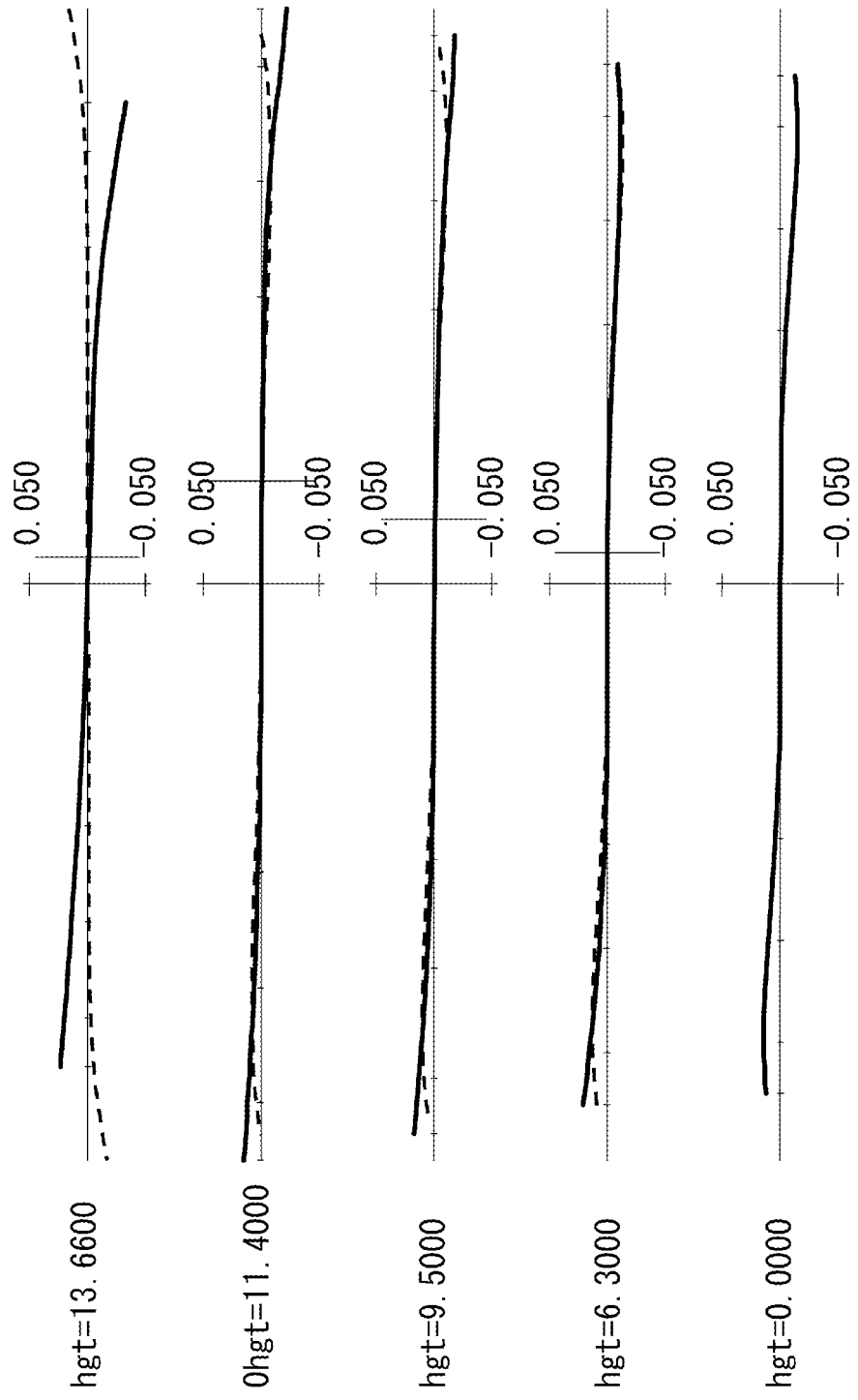

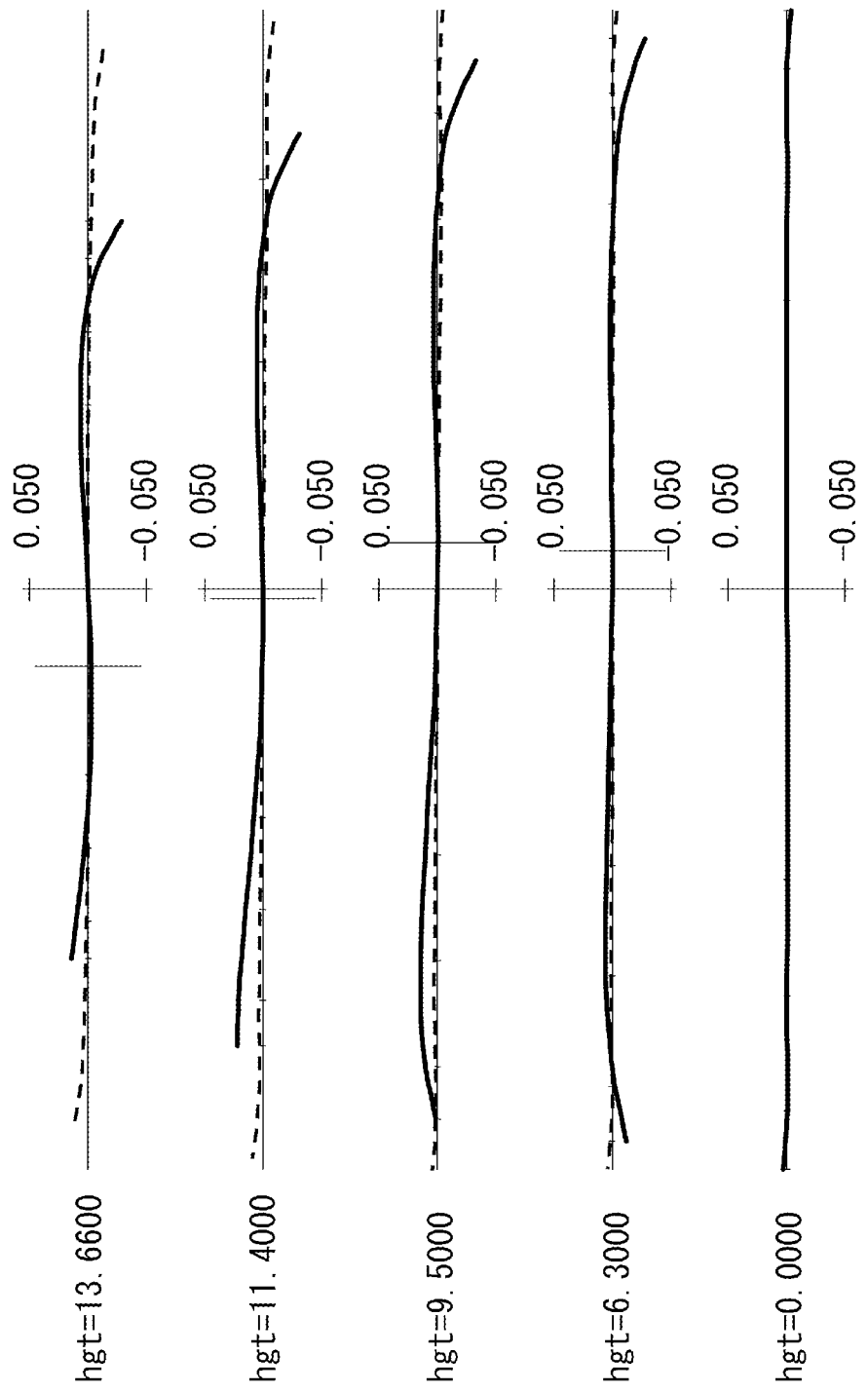

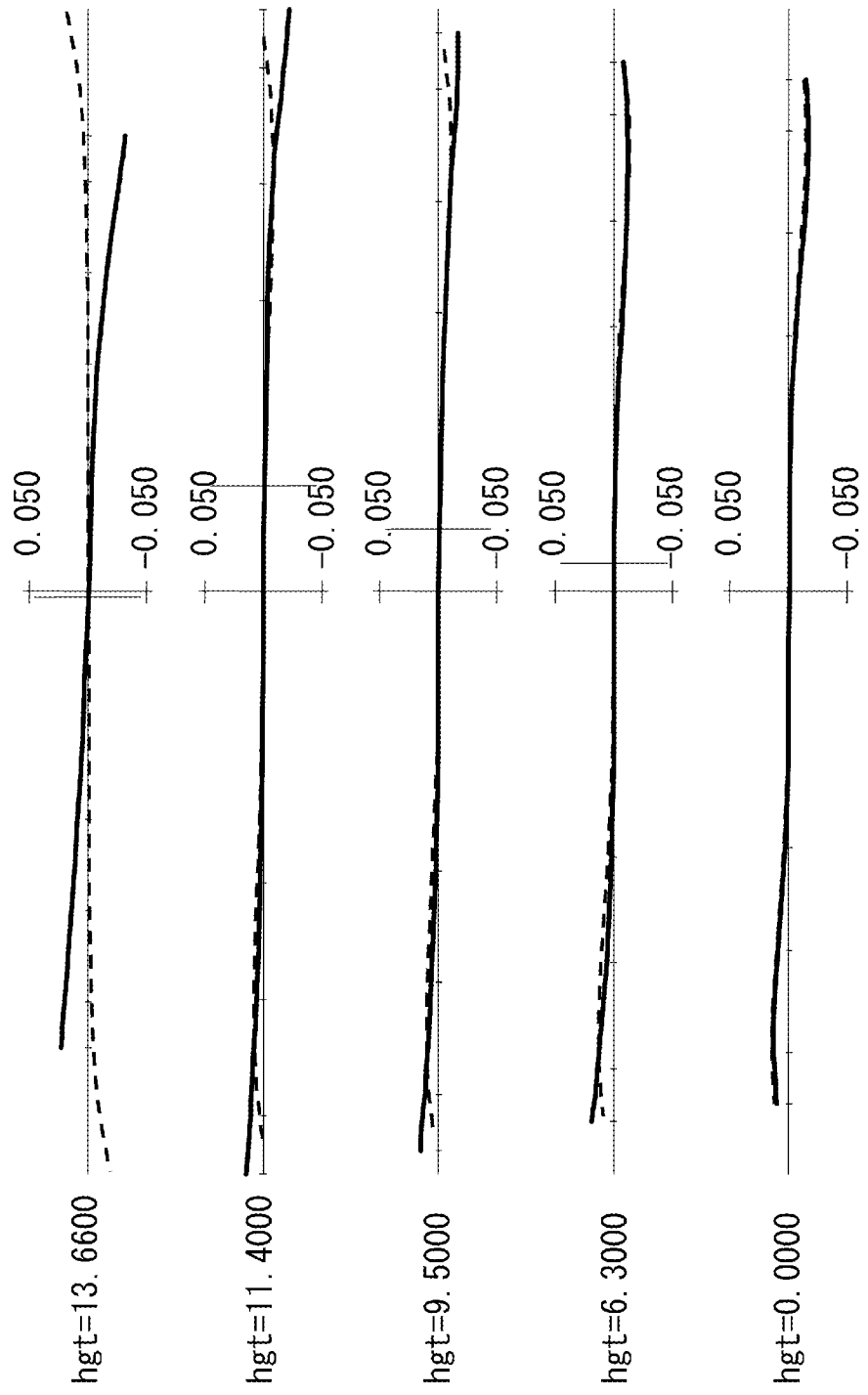

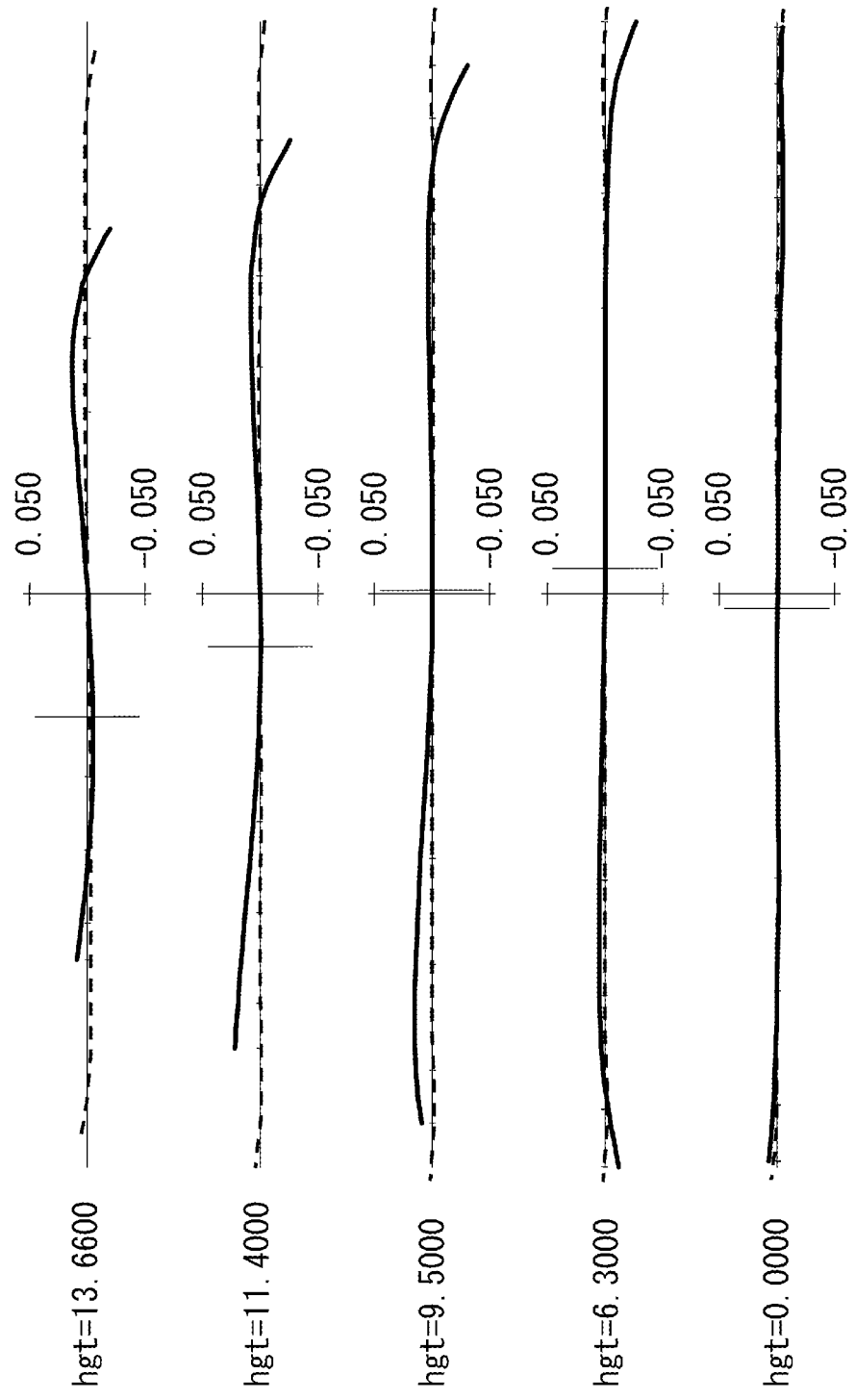

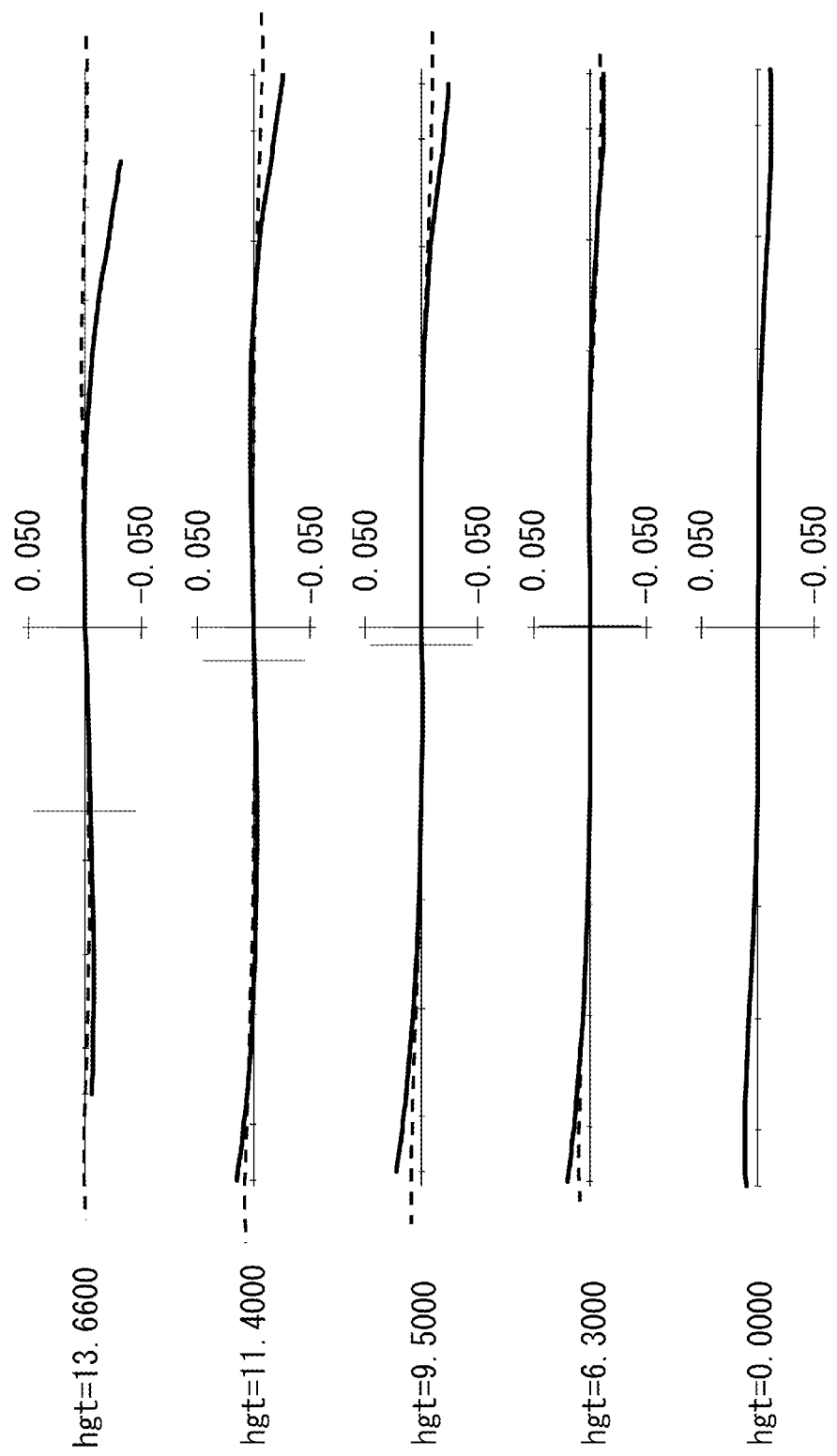

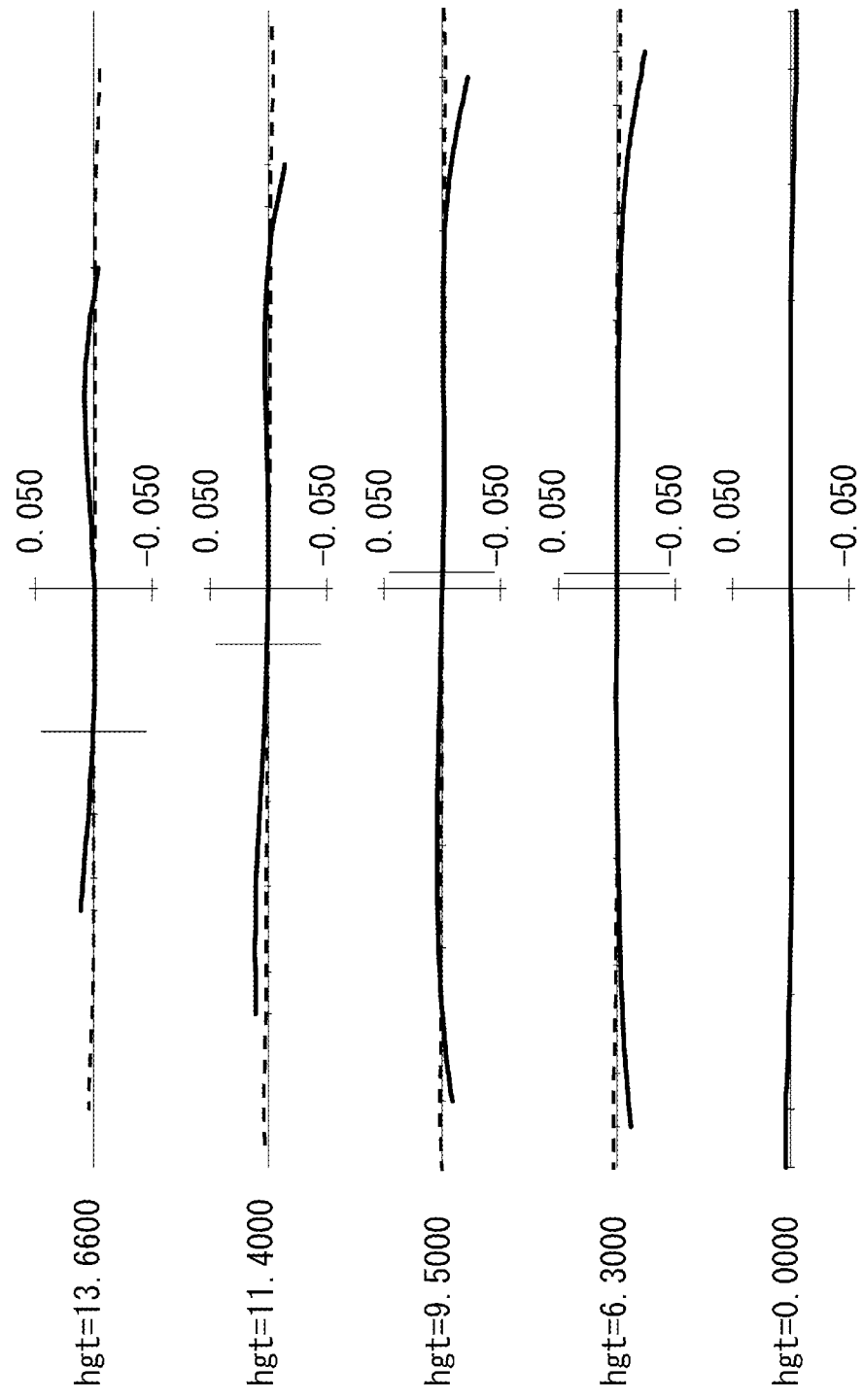

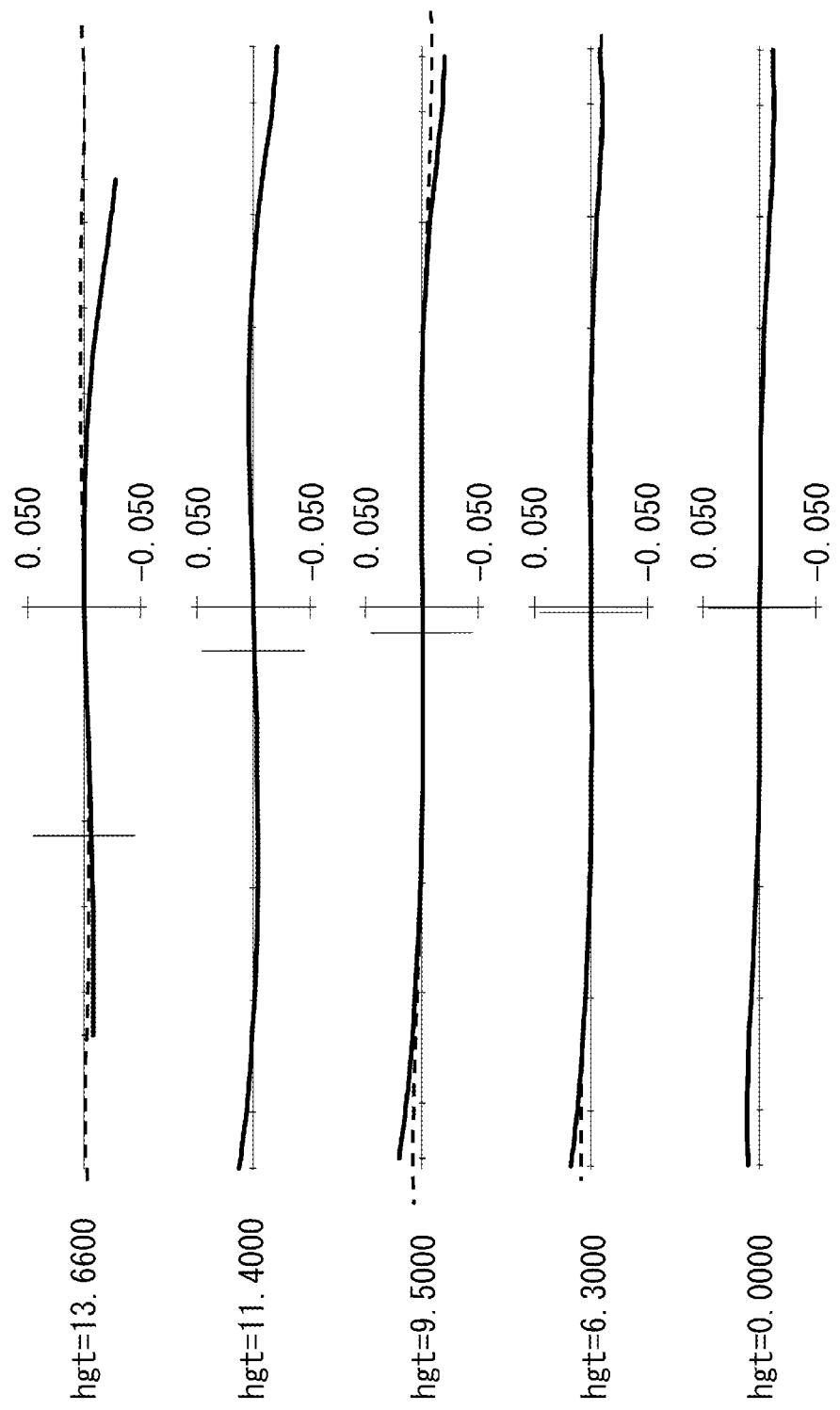

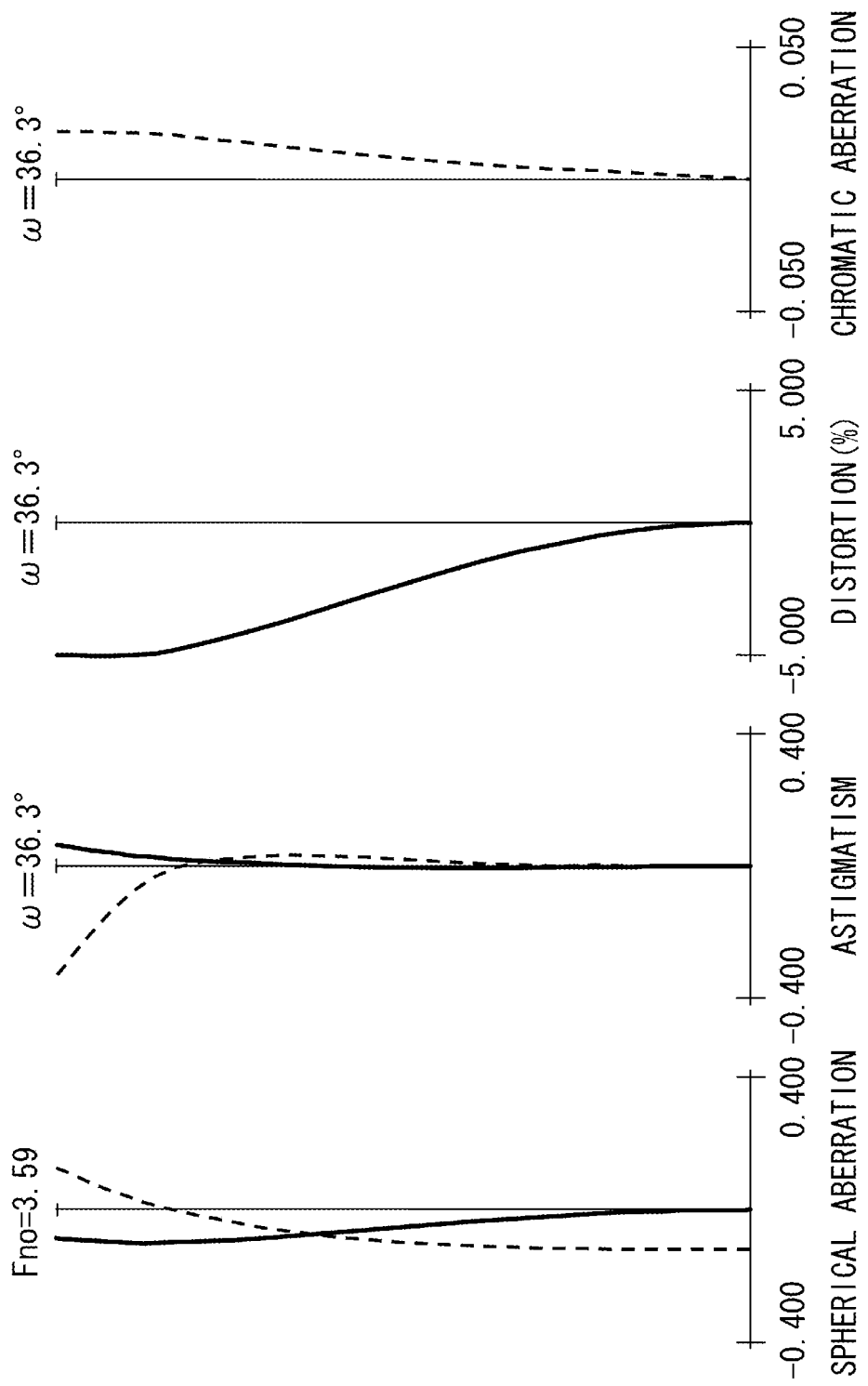

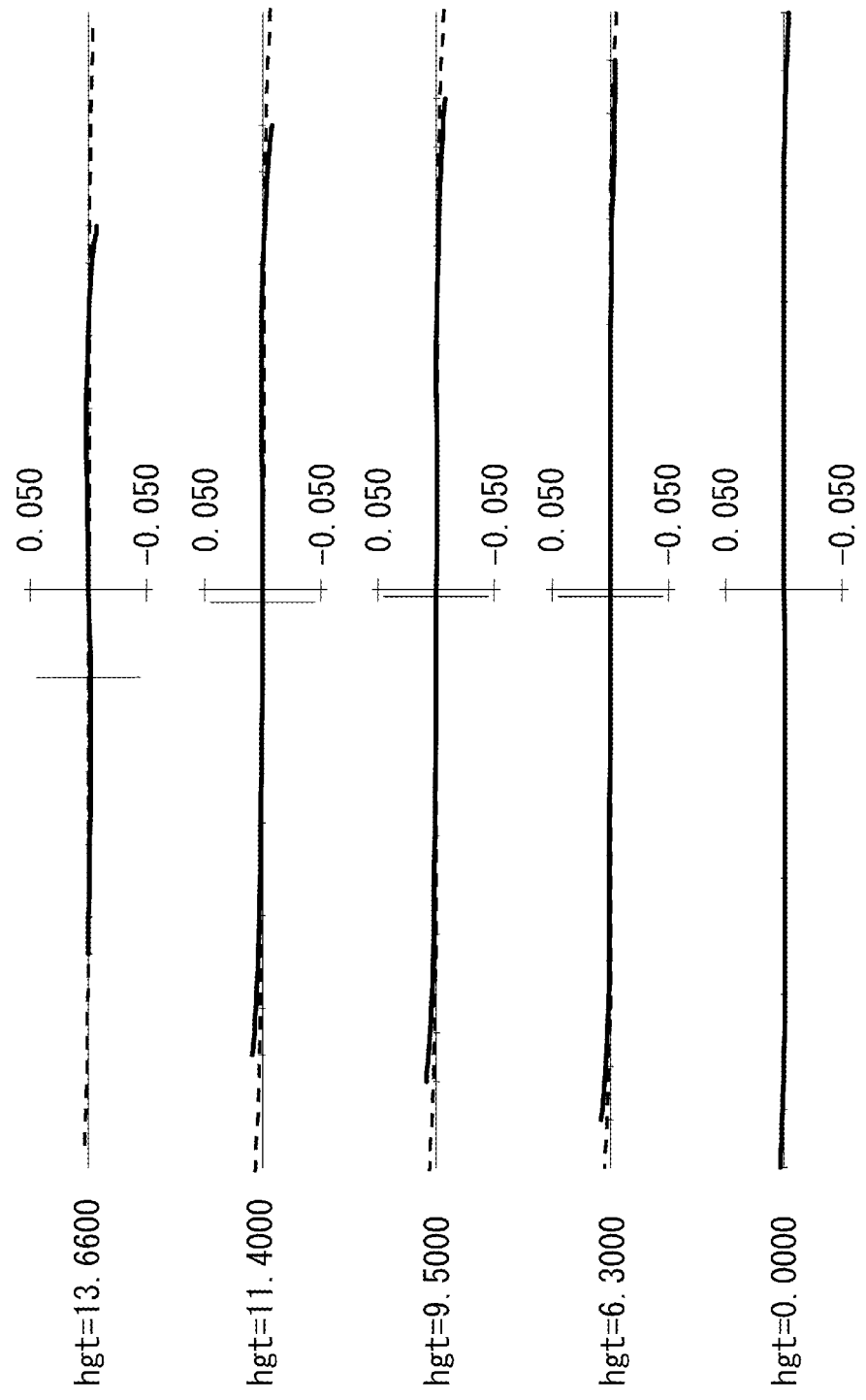

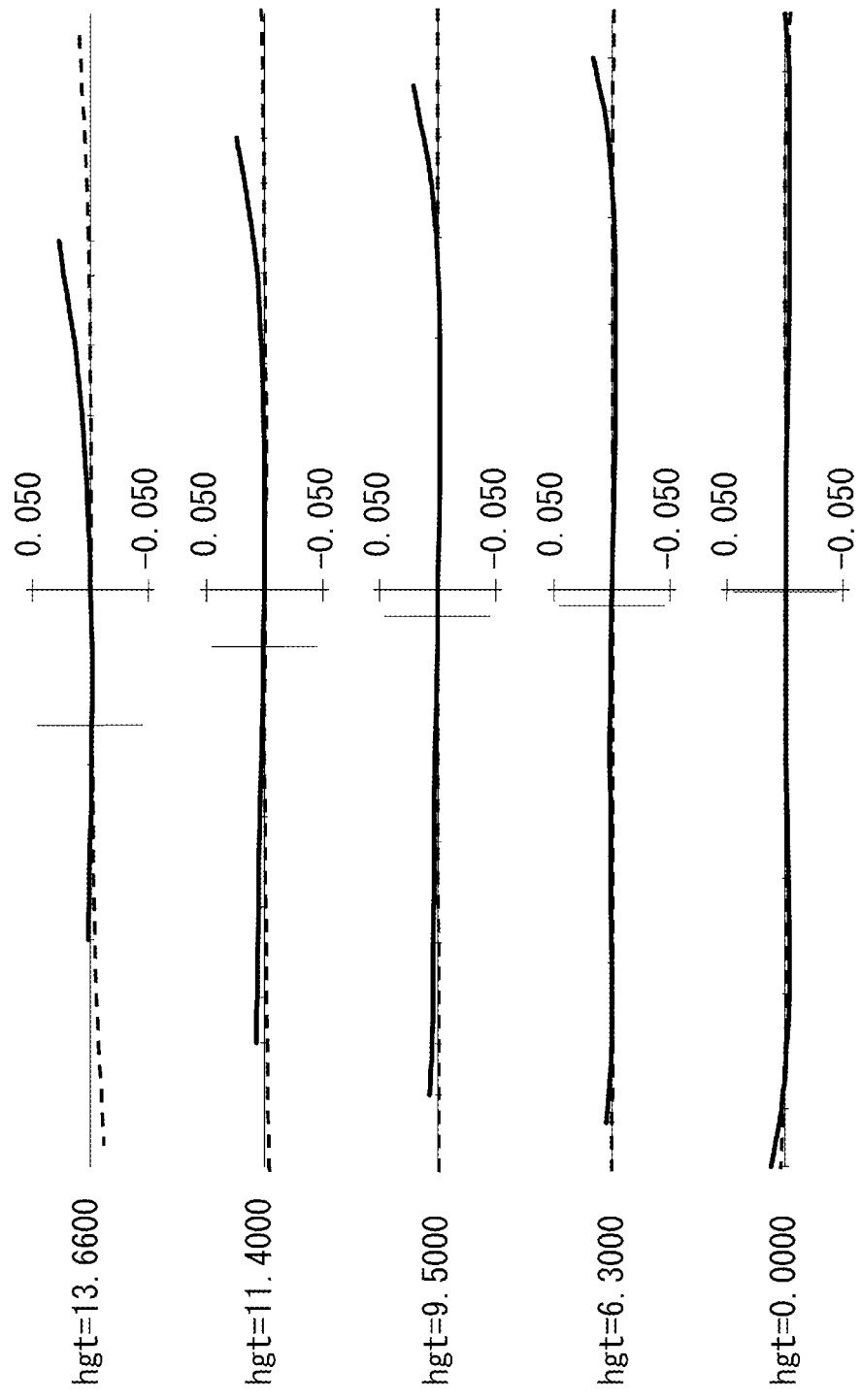

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same, and, more particularly, to a zoom lens that is suitable, for example, for an image pickup apparatus using a solid-state image sensor such as a video camera, an electronic still camera, a broadcasting camera, and a monitoring camera or an image pickup apparatus such as a camera using a silver-halide film.

2. Description of the Related Art

A photographic optical system used for an image pickup apparatus using a solid-state image sensor requires a zoom lens having a high zoom ratio and high resolution. Further, an image stabilizing mechanism for compensating for a shake of an image generated when vibrations due to a camera shake is transferred to the zoom lens is required.

When an image stabilizing lens unit for image shake correction is moved in a direction perpendicular to an optical axis to correct an image shake, an aberration variation in image shake correction is required to be small and an excellent optical performance is required to be maintained during image stabilization.

For this reason, it is important to appropriately set a configuration of the entire lens or configurations of an image stabilizing lens unit and a lens unit disposed on the image side of the image stabilizing lens unit. For example, it becomes important to appropriately set a refractive power of an image stabilizing lens unit, a refractive power of a lens unit disposed on the image side of the image stabilizing lens unit, or an amount of movement during zooming. If the configurations are not set appropriately, it becomes very difficult to miniaturize an entire zoom lens, and maintain a high optical performance during image stabilization while securing a high zoom ratio.

Japanese Patent Application Laid-Open No. 2010-271362 discusses a zoom lens including first to fifth lens units having positive, negative, positive, negative, and positive refractive powers in order from an object side to an image side, in which an image shake correction is performed in a lens unit such as the fourth lens unit. U.S. Patent Application Publication No. 2011/0116174 and U.S. Pat. No. 7,889,438 discuss a zoom lens including first to fourth lens units having positive, negative, positive, and positive refractive powers in order from an object side to an image side, in which an image shake correction is performed in a lens unit such as the third lens unit.

In positive lead type zoom lenses discussed in Japanese Patent Application Laid-Open No. 2010-271362 and U.S. Patent Application Publication No. 2011/0116174, a zooming effect is mostly achieved as a first lens unit having a positive refractive power is moved toward an object side with respect to a second lens unit having a negative refractive power. During zooming, increasing the amount of forward movement of a first lens unit is advantageous to shortening a total lens length at a wide-angle end for determining the total lens length (a length from the first lens surface to the last lens surface), and to achieving high optical performance.

However, if the amount of forward movement of the first lens unit is large, a lens barrel having a length corresponding to the amount of forward movement needs to be stowed in the body. For this reason, the amount of forward movement of the first lens unit is limited by the total lens length depending on the specification, and thus a high zoom ratio is difficult to achieve and a study on a mechanical configuration for stepwise forward movement is required.

SUMMARY OF THE INVENTION

An example of the present invention is directed to a zoom lens that is capable of excellently correcting an aberration variation in image shake correction and achieving high optical performance during an image stabilizing operation while securing a high zoom ratio in a compact zoom lens.

According to an aspect of the present invention, a zoom lens includes N lens units, in which a lens unit having a positive refractive power is disposed closest to an object side, wherein each lens unit is moved to effect zooming, wherein an (N−1)th lens unit and an N-th lens unit, counted from the object side, have positive refractive powers, wherein the (N−1)th lens unit includes a first lens subunit (N−1)A having a positive refractive power and a second lens subunit (N−1)B having a negative refractive power in order from the object side to an image side, wherein the second lens subunit (N−1)B is moved to have a component in a direction perpendicular to an optical axis to move an image position, and wherein, when a focal length of the N-th lens unit is fN, a back focus at a telephoto end is bkt, an amount of movement of the N-th lens unit during zooming from a wide-angle end to the telephoto end is mN, and a sign of the amount of movement is positive when the N-th lens unit is moved from the object side to the image side, the following conditions are satisfied:

$$1.05 < fN/(bkt-fN) < 3.00$$

$$0.65 < -mN/fN < 1.50.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B are longitudinal aberration diagrams of the zoom lens at the wide-angle end and a telephoto end, respectively, according to the first exemplary embodiment of the present invention.

FIGS. 4A and 4B are lateral aberration diagrams of the zoom lens at the wide-angle end and the telephoto end, respectively, when an image stabilizing operation of 0.3 degrees is performed according to the first exemplary embodiment of the present invention.

FIG. 5 is a lens sectional view of a zoom lens at a wide-angle end according to a second exemplary embodiment of the present invention.

FIGS. 6A and 6B are longitudinal aberration diagrams of the zoom lens at the wide-angle end and a telephoto end, respectively, according to the second exemplary embodiment of the present invention.

FIGS. 7A and 7B are lateral aberration diagrams of the zoom lens at the wide-angle end and the telephoto end, respectively, according to the second exemplary embodiment of the present invention, respectively.

FIGS. 8A and 8B are lateral aberration diagrams of the zoom lens at the wide-angle end and the telephoto end, respectively, respectively, when an image stabilizing operation of 0.3 degrees is performed according to the second exemplary embodiment of the present invention.

FIGS. 11A and 11B are lateral aberration diagrams of the zoom lens at the wide-angle end and the telephoto end, respectively, according to the third exemplary embodiment of the present invention.

FIGS. 12A and 12B are lateral aberration diagrams of the zoom lens at the wide-angle end and the telephoto end, respectively, when an image stabilizing operation of 0.3 degrees is performed according to the third exemplary embodiment of the present invention.

FIGS. 14A and 14B are longitudinal aberration diagrams of the zoom lens at the wide-angle end and a telephoto end, respectively, according to the fourth exemplary embodiment of the present invention.

FIGS. 15A and 15B are lateral aberration diagrams of the zoom lens at the wide-angle end and the telephoto end, respectively, according to the fourth exemplary embodiment of the present invention.

FIGS. 16A and 16B are lateral aberration diagrams of the zoom lens at the wide-angle end and the telephoto end, respectively, when an image stabilizing operation of 0.3 degrees is performed according to the fourth exemplary embodiment of the present invention.

DESCRIPTION OF THE EMBODIMENTS

Various exemplary embodiments, features, and aspects of the invention will be described in detail below with reference to the drawings.

In a zoom lens according to an exemplary embodiment of the present invention, a lens unit having a positive refractive power is disposed closest to an object side, and the zoom lens includes N (N is an integer of 4 to 6) lens units in its entirety, in which zooming is effected by moving each of the lens units. The (N−1)th lens unit and the N-th lens unit, when counted from the object side, have positive refractive powers, and the (N−1)th lens unit includes a first lens subunit (N−1)A having a positive refractive power and a second lens subunit (N−1)B having a negative refractive power in order from the object side to the image side.

Further, an image position is moved by moving the second lens subunit (N−1)B to have a component in a direction perpendicular to an optical axis. Thus, an image stabilizing operation is performed.

Figure 1:
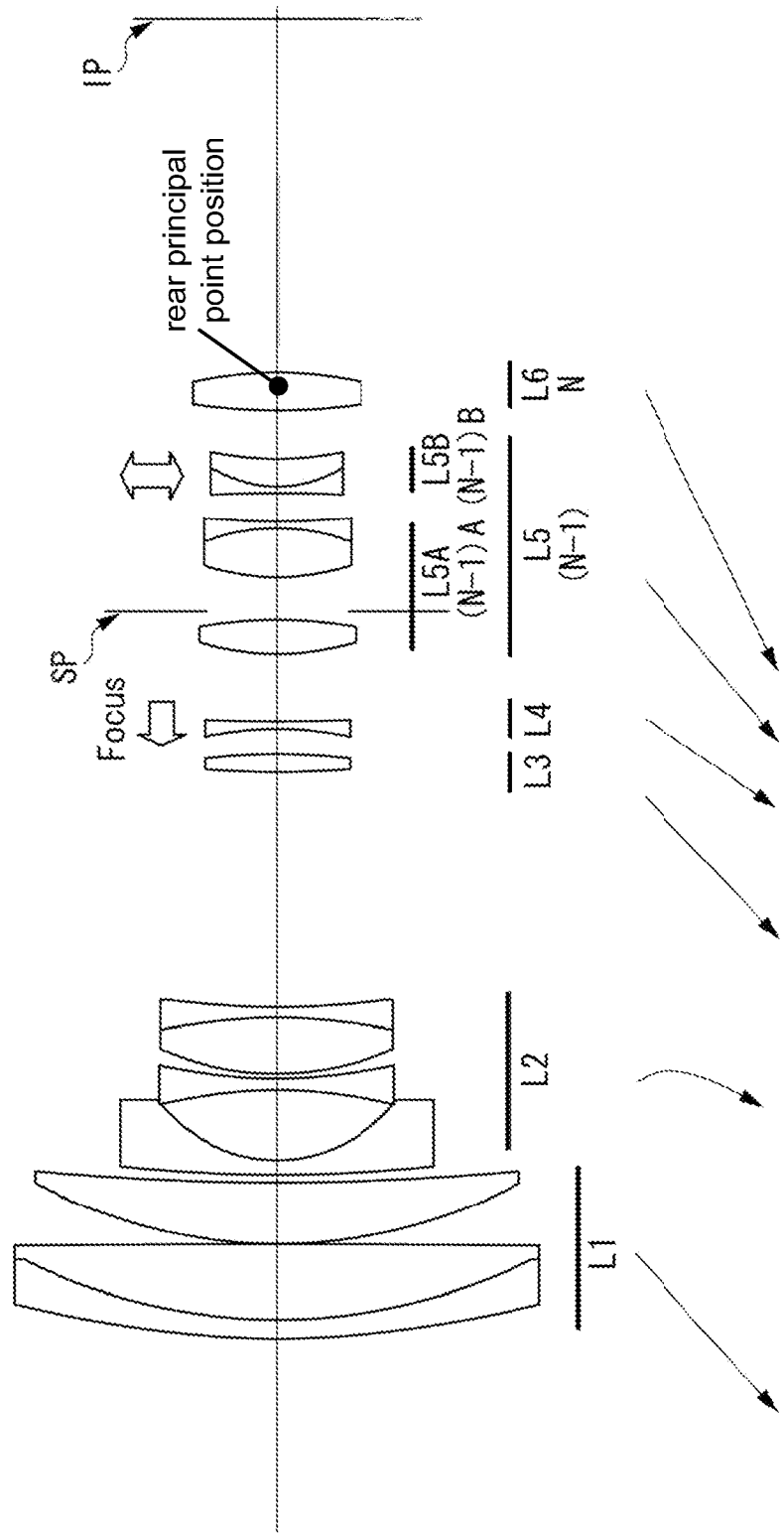
FIG. 1 is a lens sectional view of a zoom lens at a wide-angle end (short focal length end) according to a first exemplary embodiment of the present invention.
Figure 3A:
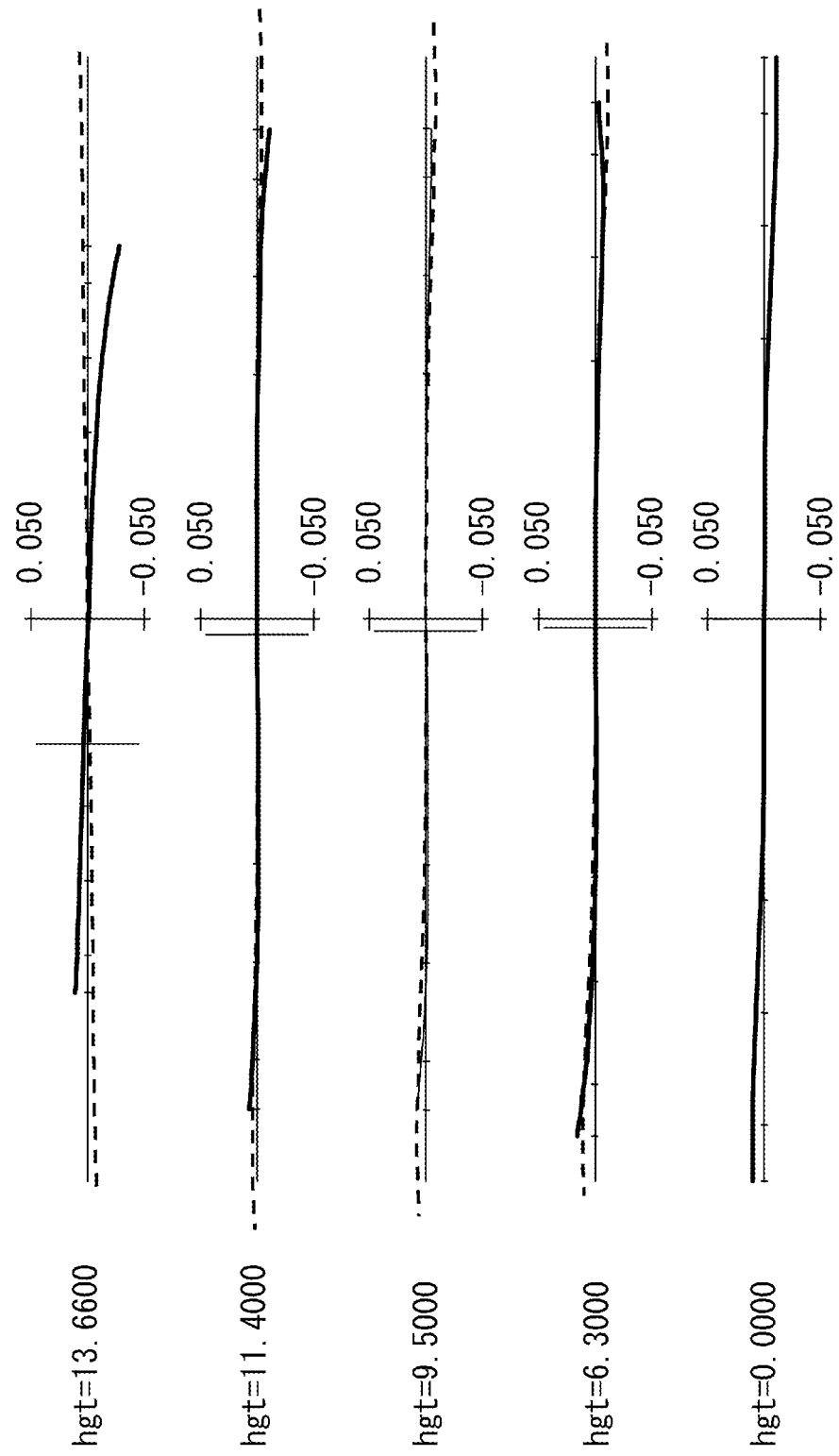
FIGS. 3A and 3B are lateral aberration diagrams of the zoom lens at the wide-angle end and the telephoto end, respectively, according to the first exemplary embodiment of the present invention.
Figure 3B:
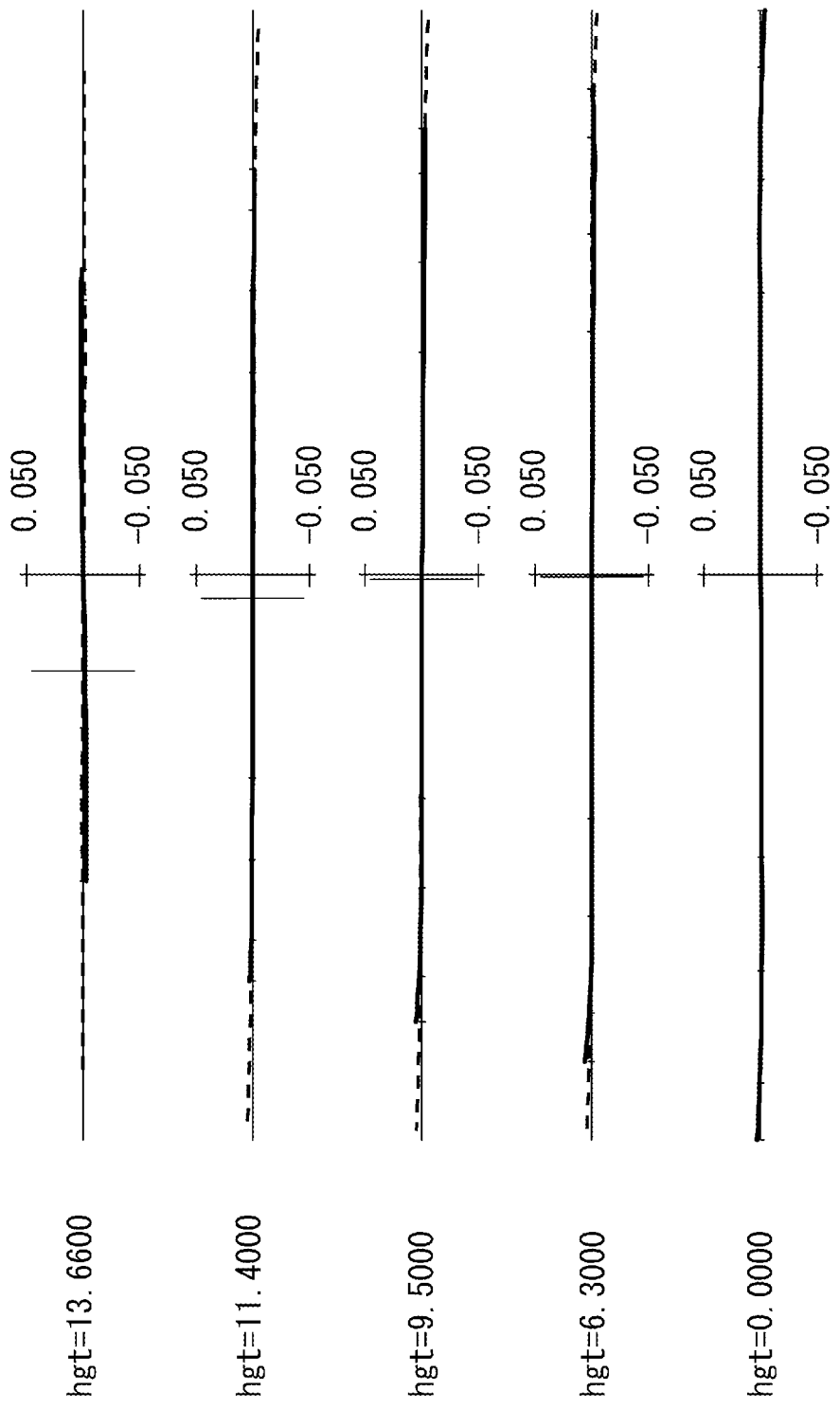
Figure 4B:
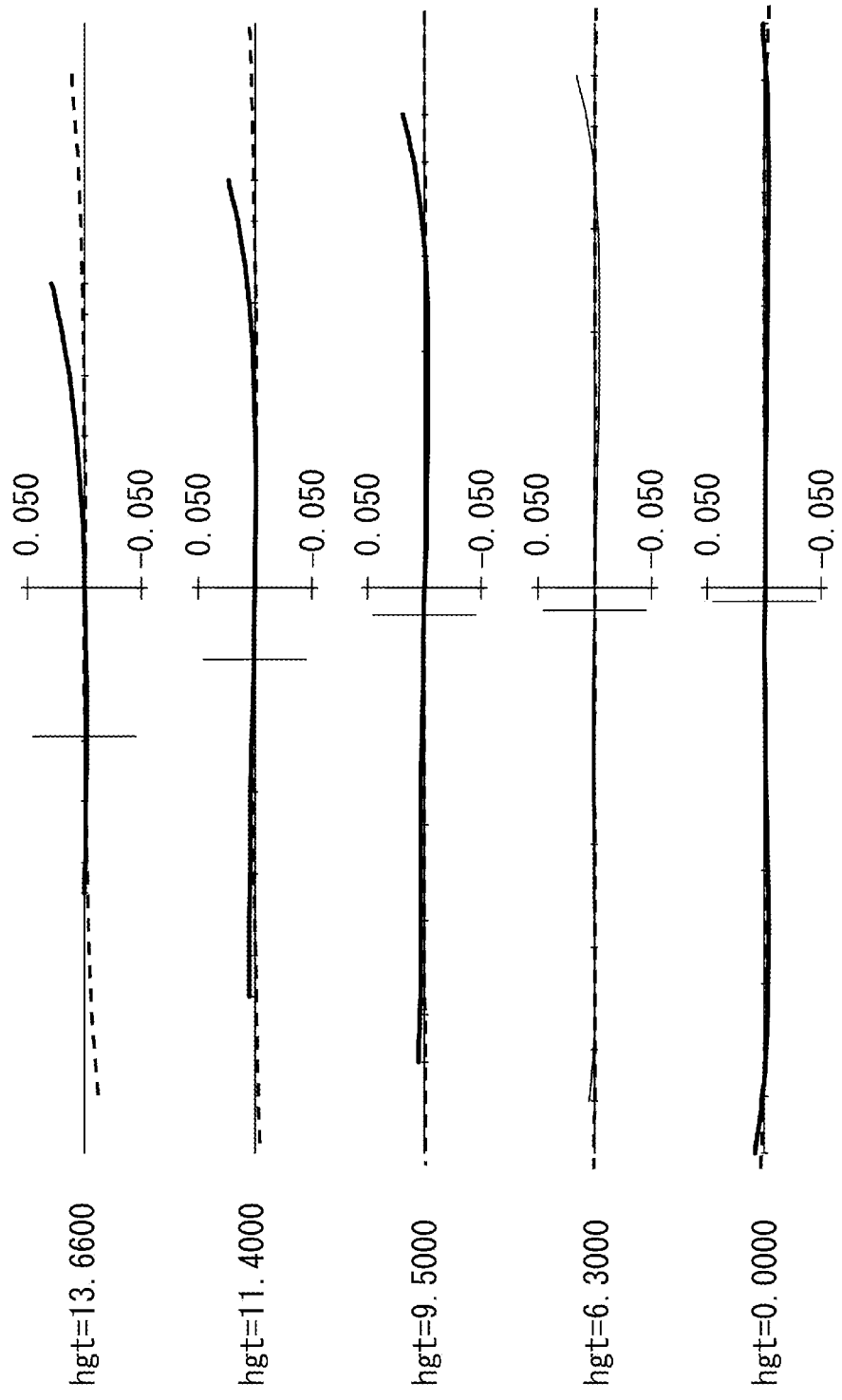

FIG. 1 is a lens sectional view of a wide-angle end (short focal length end) of a zoom lens according to a first exemplary embodiment of the present invention. FIGS. 2A and 2B are longitudinal aberration diagrams of the zoom lens at the wide-angle end and a telephoto end (long focal length end), respectively, according to the first exemplary embodiment of the present invention. FIGS. 3A and 3B are lateral aberration diagrams of the zoom lens at the wide-angle end and the telephoto end, respectively, of the zoom lens according to the first exemplary embodiment of the present invention. FIGS. 4A and 4B are lateral aberration diagrams of the zoom lens at the wide-angle end and the telephoto end, respectively, after an image position is changed by 0.3 degrees according to the first exemplary embodiment of the present invention. The first exemplary embodiment corresponds to a zoom lens having a zoom ratio of 7.02 and an aperture ratio (F-number) of 3.59 to 5.88.

Figure 6B:
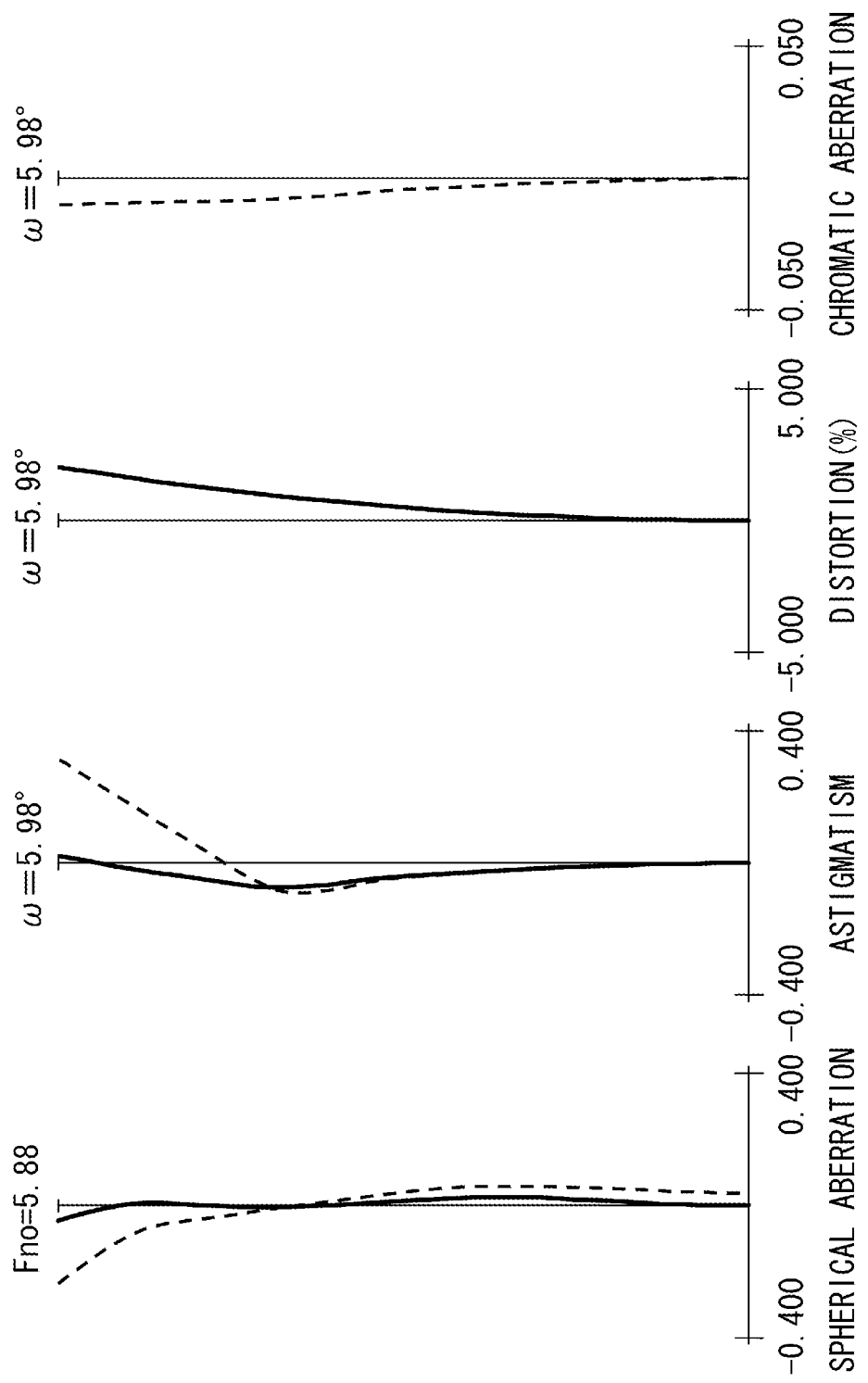

FIG. 5 is a lens sectional view of a zoom lens at a wide-angle end according to a second exemplary embodiment of the present invention. FIGS. 6A and 6B are longitudinal aberration diagrams of the zoom lens at the wide-angle end and a telephoto end, respectively, of the zoom lens according to the second exemplary embodiment of the present invention. FIGS. 7A and 7B are lateral aberration diagrams of the zoom lens at the wide-angle end and the telephoto end, respectively, according to the second exemplary embodiment of the present invention. FIGS. 8A and 8B are lateral aberration diagrams of the zoom lens at the wide-angle end and the telephoto end, respectively, after an image position is changed by 0.3 degrees according to the second exemplary embodiment of the present invention. The second exemplary embodiment corresponds to a zoom lens having a zoom ratio of 7.02 and an aperture ratio of 3.50 to 5.88.

Figure 9:
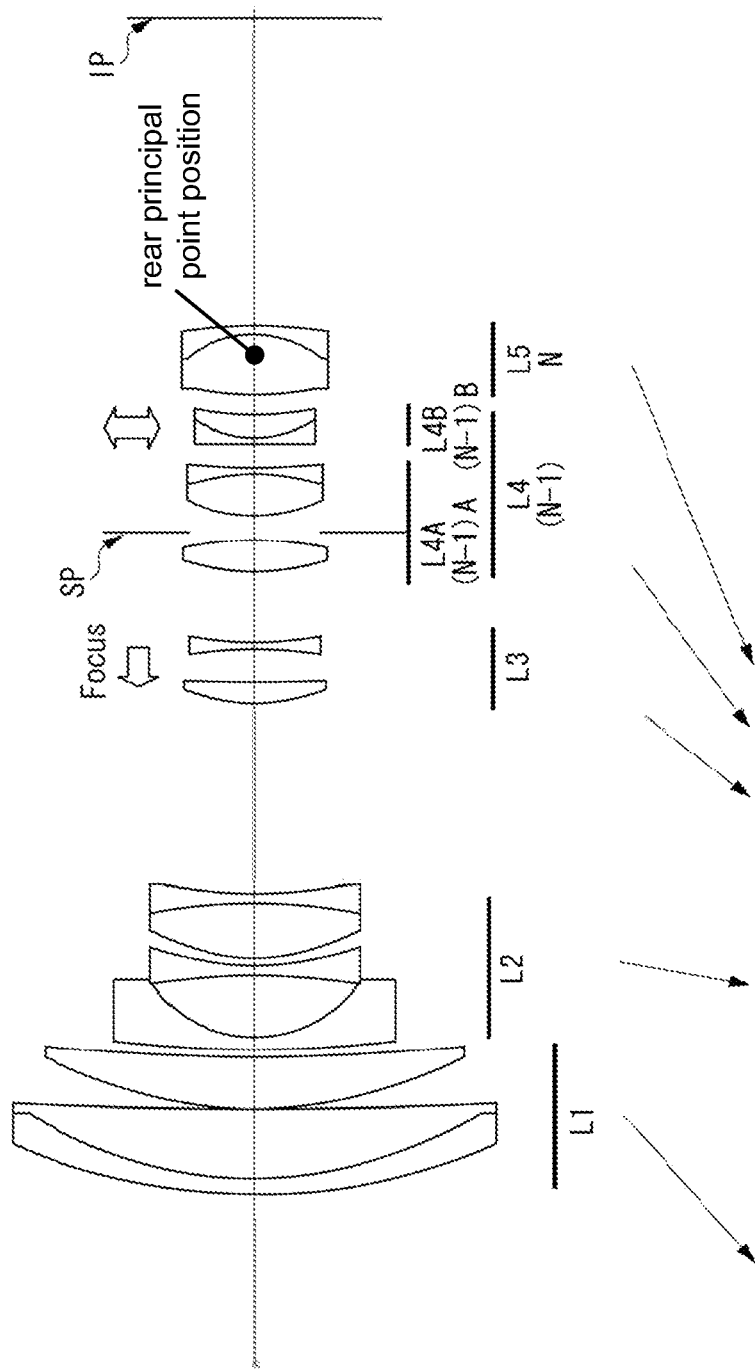
FIG. 9 is a lens sectional view of a zoom lens at a wide-angle end according to a third exemplary embodiment of the present invention.
Figure 10A:
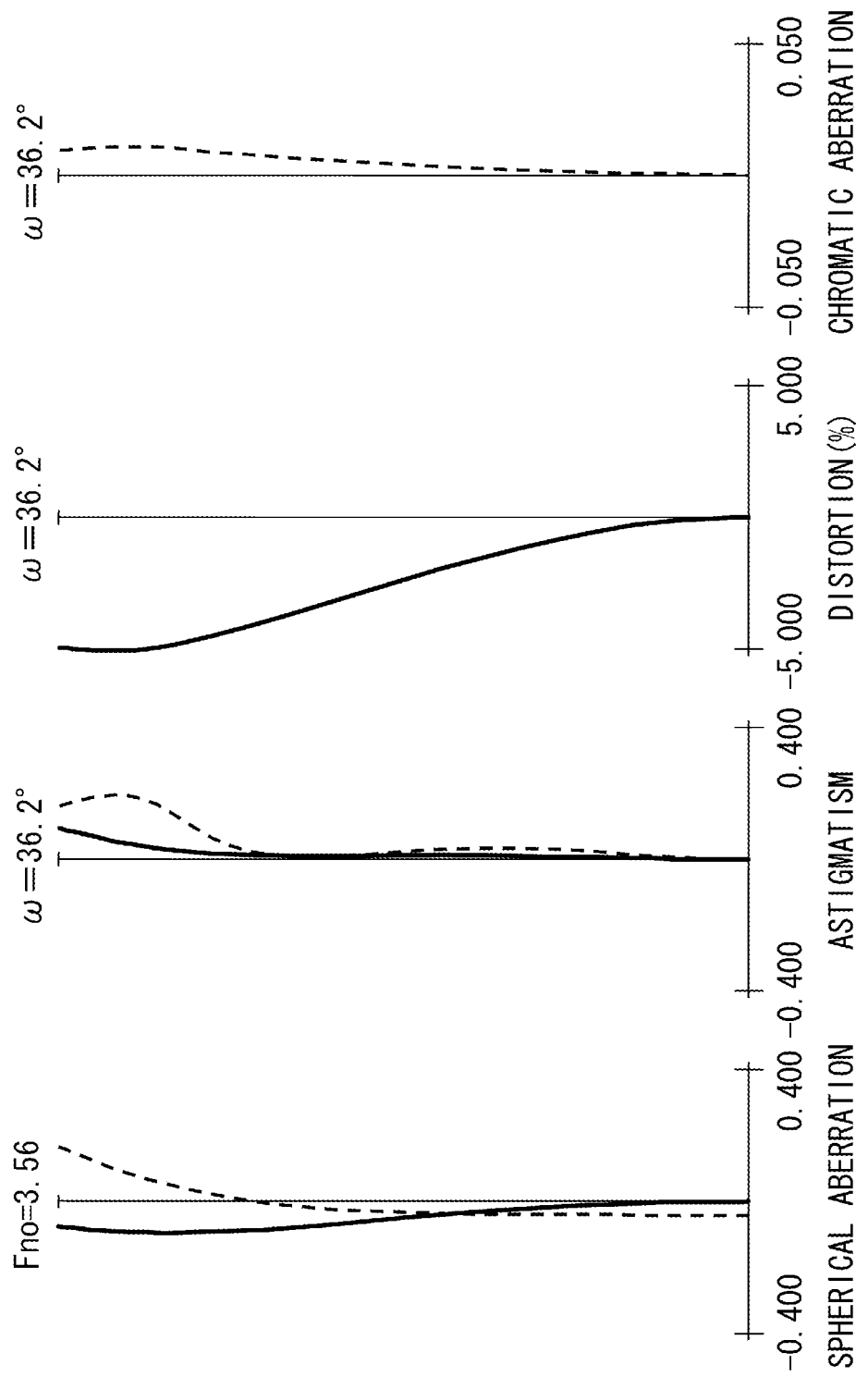
FIGS. 10A and 10B are longitudinal aberration diagrams of the zoom lens at the wide-angle end and a telephoto end, respectively, according to the third exemplary embodiment of the present invention.
Figure 10B:
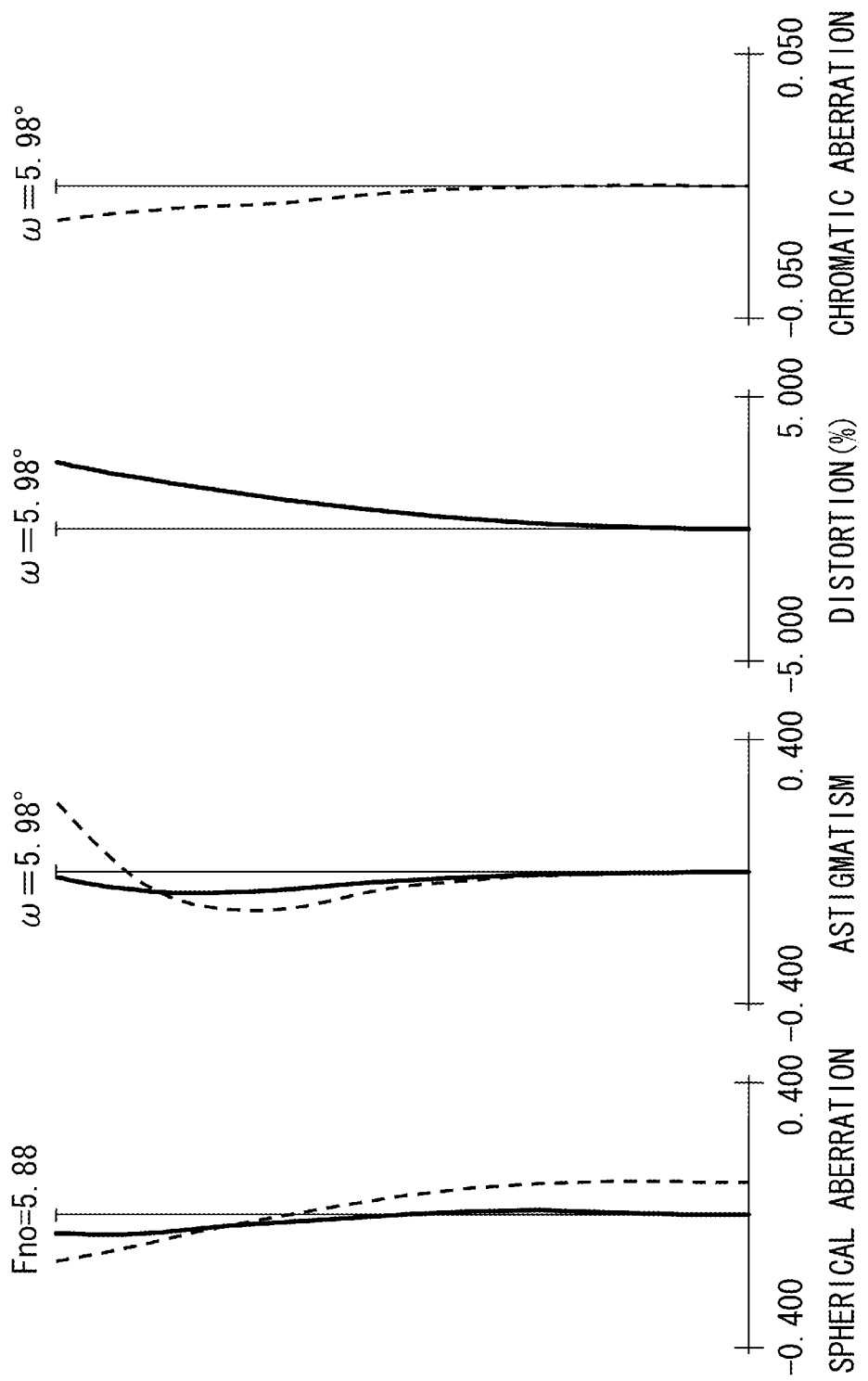
Figure 12B:
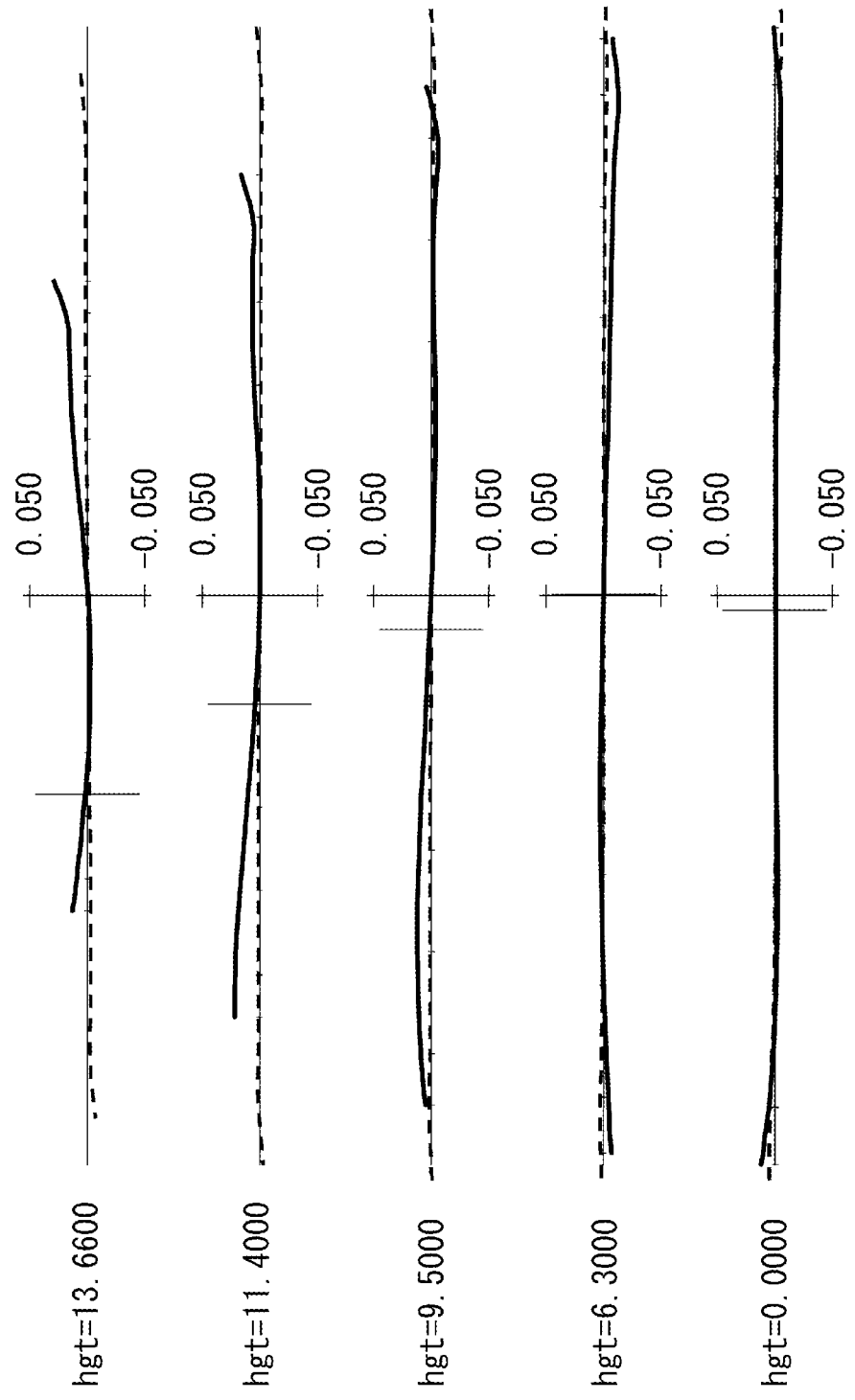

FIG. 9 is a lens sectional view of a zoom lens at a wide-angle end according to a third exemplary embodiment of the present invention. FIGS. 10A and 10B are longitudinal aberration diagrams of the zoom lens at the wide-angle end and a telephoto end, respectively, according to the third exemplary embodiment of the present invention. FIGS. 11A and 11B are lateral aberration diagrams of the zoom lens at the wide-angle end and the telephoto end, respectively, according to the third exemplary embodiment of the present invention. FIGS. 12A and 12B are lateral aberration diagrams of the zoom lens at the wide-angle end and the telephoto end, respectively, after an image position is changed by 0.3 degrees according to the third exemplary embodiment of the present invention. The third exemplary embodiment corresponds to a zoom lens having a zoom ratio of 6.99 and an aperture ratio of 3.56 to 5.88.

Figure 13:
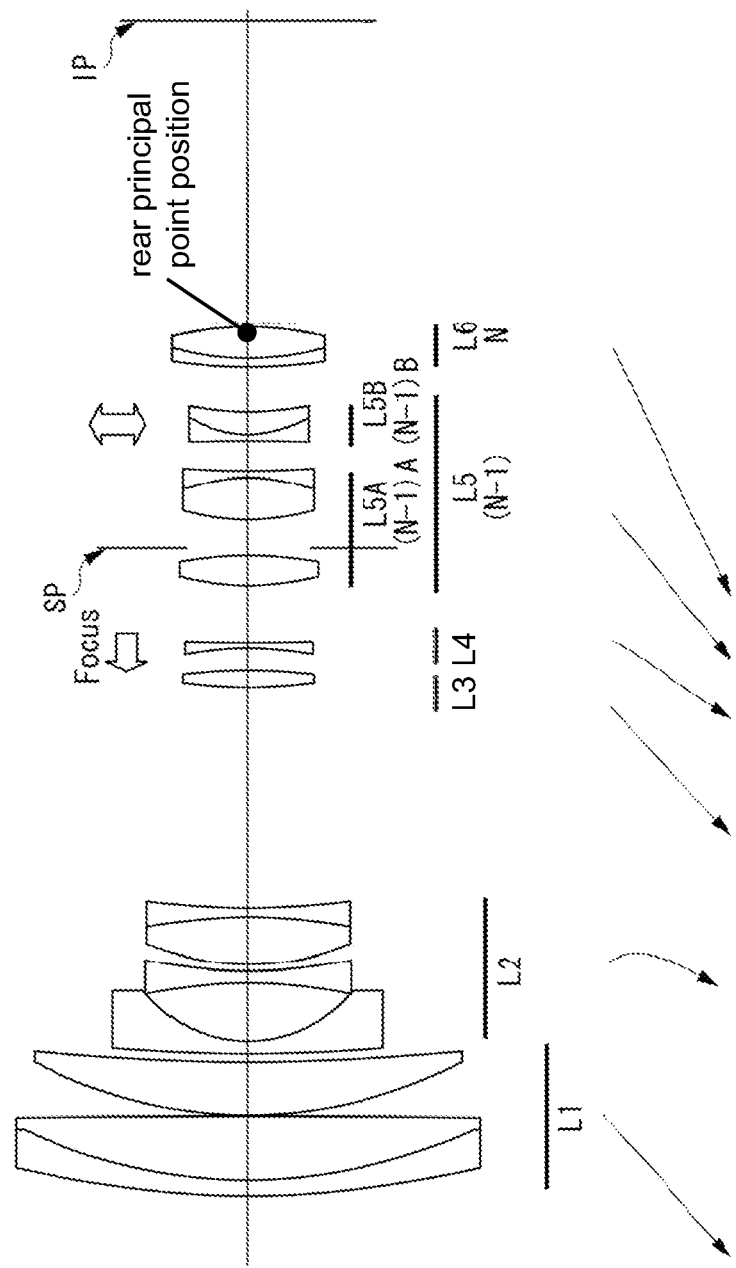
FIG. 13 is a lens sectional view of a zoom lens at a wide-angle end according to a fourth exemplary embodiment of the present invention.
Figure 14B:
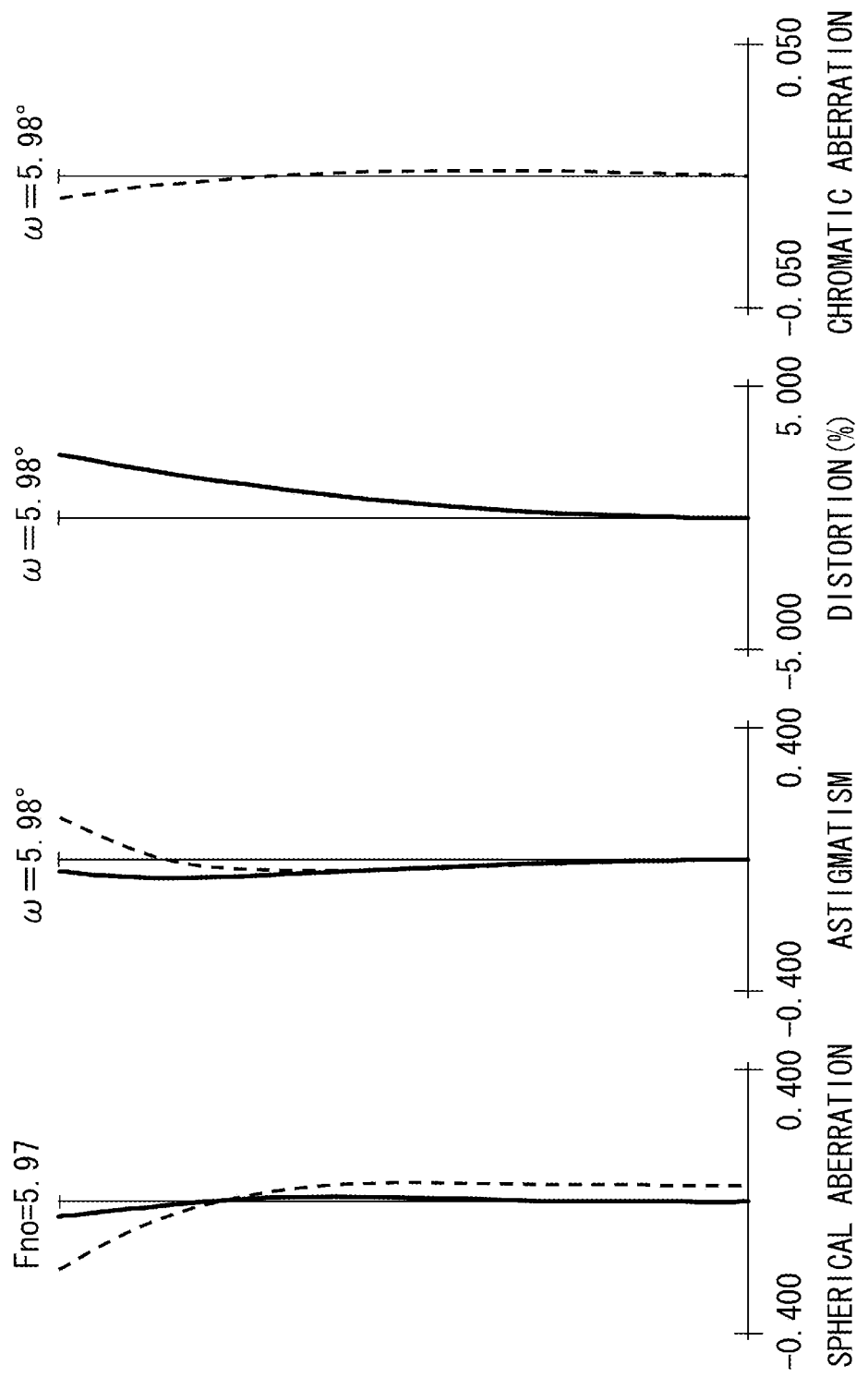
Figure 15A:
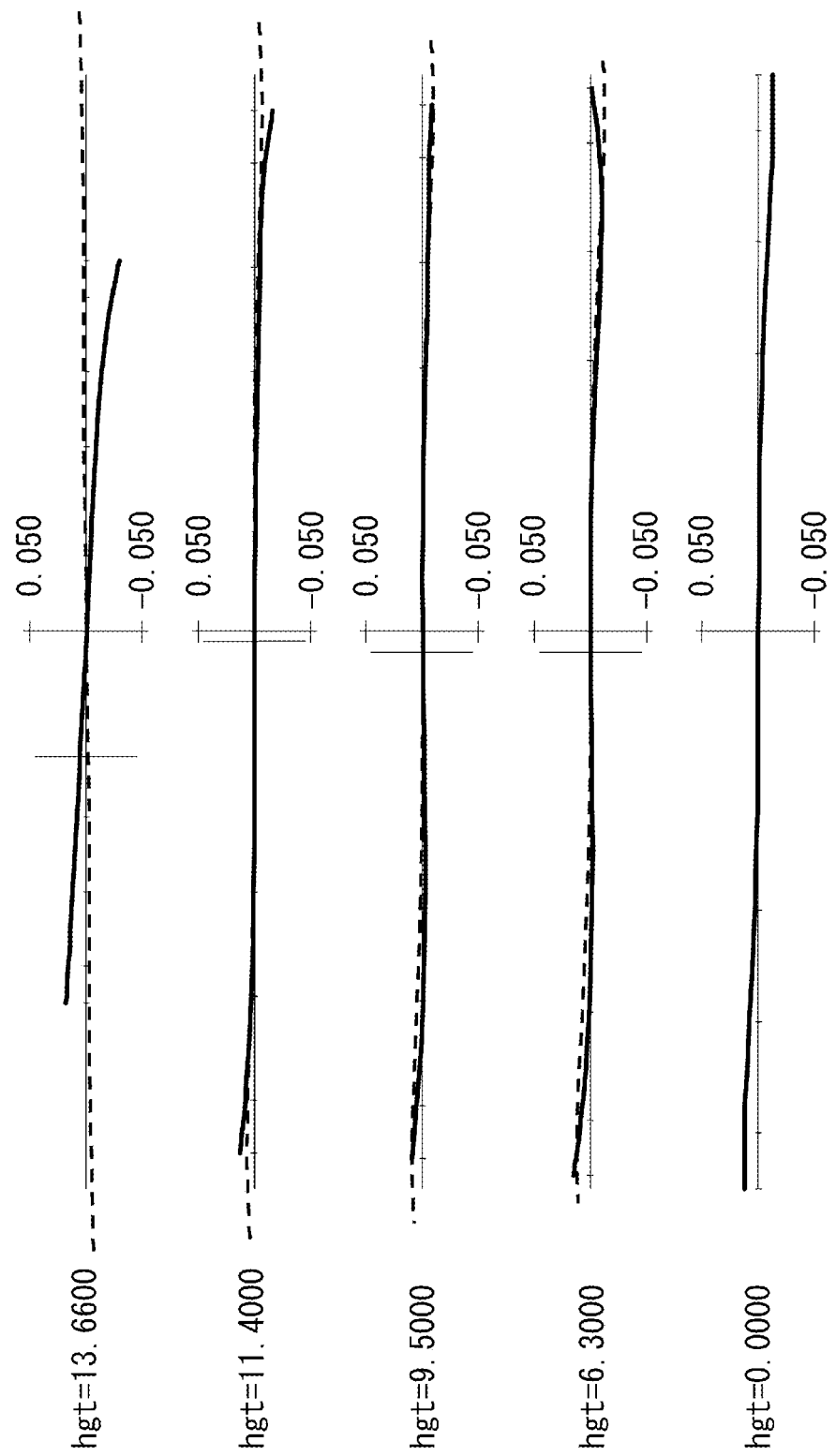
Figure 16A:
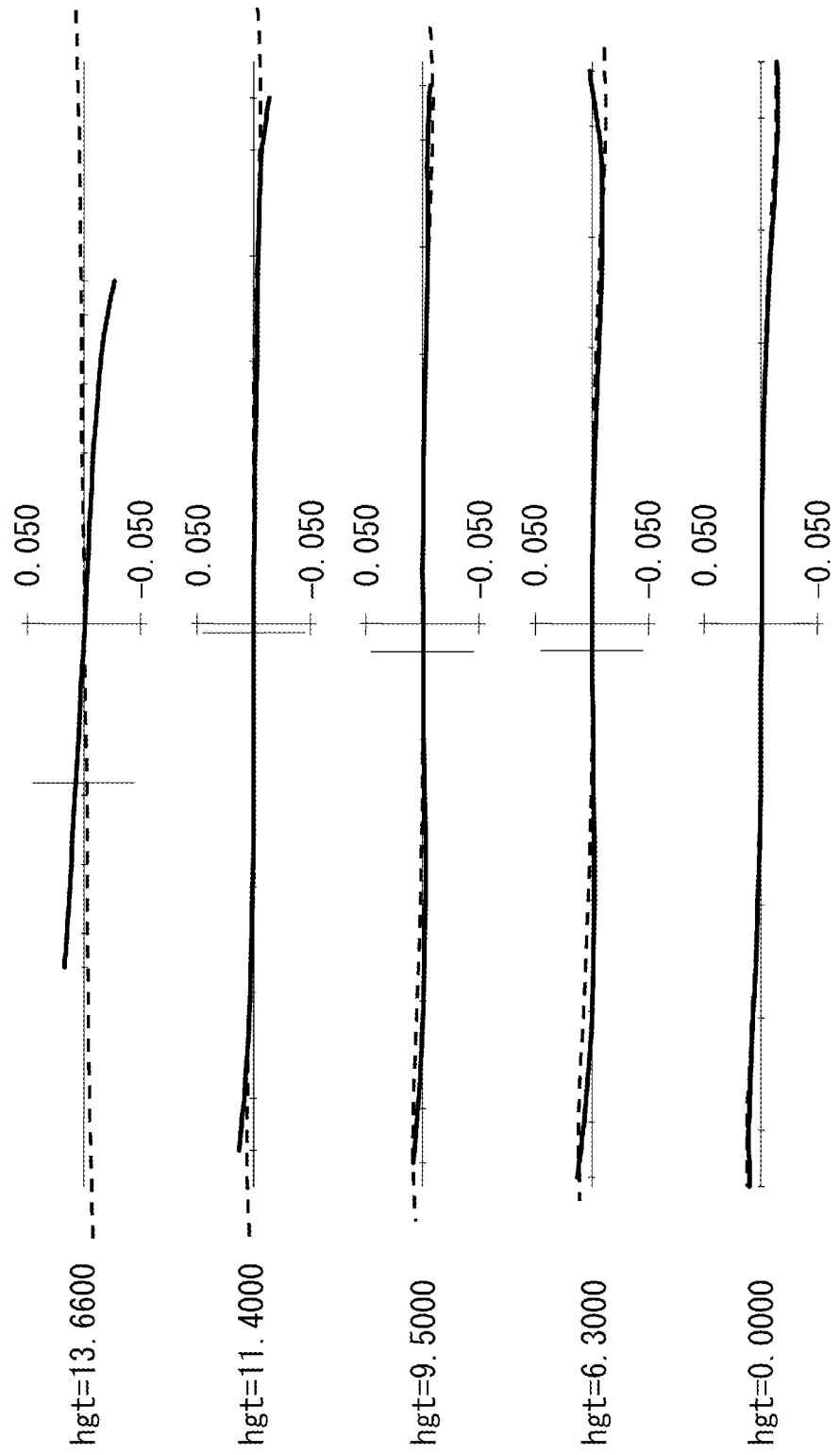
Figure 17:
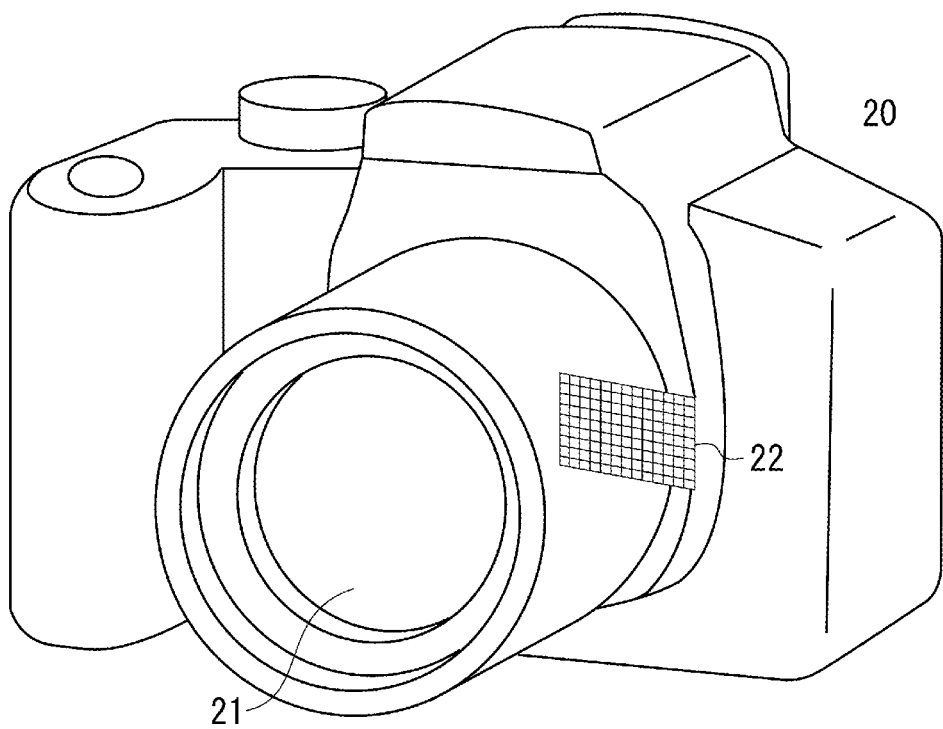
FIG. 17 is a schematic view illustrating principal components of an image pickup apparatus according to an exemplary embodiment of the present invention.

FIG. 13 is a lens sectional view of a zoom lens at a wide-angle end according to a fourth exemplary embodiment of the present invention. FIGS. 14A and 14B are longitudinal aberration diagrams of the zoom lens at the wide-angle end and a telephoto end, respectively, of the zoom lens according to the fourth exemplary embodiment of the present invention. FIGS. 15A and 15B are lateral aberration diagrams of the zoom lens at the wide-angle end and the telephoto end, respectively, according to the fourth exemplary embodiment of the present invention. FIGS. 16A and 16B are lateral aberration diagrams of the zoom lens at the wide-angle end and the telephoto end, respectively, after an image position is changed by 0.3 degrees according to the fourth exemplary embodiment of the present invention. The fourth exemplary embodiment corresponds to a zoom lens having a zoom ratio of 7.02 and an aperture ratio of 3.59 to 5.97. FIG. 17 is a schematic view illustrating principal components of an image pickup apparatus according to an exemplary embodiment of the present invention.

The zoom lens according to an exemplary embodiment of the present invention can be used for an image pickup apparatus such as a digital camera, a video camera, a silver-halide film camera. In the lens sectional diagram, the left side is the front side (an object side, an enlargement side) and the right side is the rear side (an image side, a reduction side). In the lens sectional diagram, i denotes an order of the lens units from the object side to the image side, and Li denotes the i-th lens unit. SP denotes an F-number determining member (hereinafter, referred to as 'an aperture stop') serving as an aperture stop for determining (limiting) a full-aperture F-number (Fno) light flux.

IP denotes an image plane, which corresponds to an imaging plane of an image sensor (photoelectric conversion element) such as a CCD sensor or a CMOS sensor when used for an imaging optical system of a video camera or a digital still camera. The image plane IP also corresponds to a photosensitive surface such as a film surface when used for an imaging optical system of a silver-halide film camera. Arrows represent movement loci of the lens units during zooming from a wide-angle end to a telephoto end. The arrows regarding focuses represent movement directions of the lens units in focusing from an infinitely-distant object to a closest-distance object.

The longitudinal aberration diagrams represent spherical aberration (axial chromatic aberration), astigmatism, distortion, and chromatic aberration of magnification in order from the left side. In the drawing illustrating spherical aberration and chromatic aberration of magnification, the solid line represents a d line (587.6 nm) and the broken line represents a g line (435.8 nm). Further, in the drawing illustrating astigmatism, the solid line represents a sagittal direction of the d line and the broken line represents a meridional direction of the d line. Further, the drawing illustrating distortion represents distortion in the d line. Fno denotes an F-number, and ω denotes a half angle of view (degree).

An image stabilizing shift is an infinitesimal amount of eccentricity in a direction perpendicular to an optical axis and does not influence longitudinal aberration, and thus a longitudinal aberration diagram during an image stabilizing operation is not given. Further, in each of the lateral aberration diagrams, the solid line represents a sagittal direction of the d line and the broken line represents a meridional direction of the d line.

The exemplary embodiments correspond to an N-unit zoom lens where a first lens unit having a positive refractive power is disposed closest to the object side, and N lens units are provided in its entirety to be moved to perform a zooming operation. The first and fourth exemplary embodiments correspond to a six-unit zoom lens of N=6. The second exemplary embodiment corresponds to a four-unit zoom lens of N=4. The third exemplary embodiment corresponds to a five-unit zoom lens of N=5.

Further, the (N−1)th lens unit and the N-th lens unit, when counted from the object side, have positive refractive powers. The (N−1)th lens unit includes a first lens subunit (N−1)A having a positive refractive power and a second lens subunit (N−1)B having a negative refractive power in order from the object side to the image side. In addition, an image position is moved by moving the second lens subunit (N−1)B to have a component in a direction perpendicular to the optical axis.

When a focal length of the N-th lens unit is fN, a back focus at the telephoto end is bkt, and an amount of movement of the N-th lens unit during zooming from the wide-angle end to the telephoto end is mN, the following conditions are satisfied:

$$1.05 < fN/(bkt-fN) < 3.00 \quad (1)$$

$$0.65 < -mN/fN < 1.50 \quad (3)$$

where a sign of the amount of movement mN is assumed to be positive when movement is made from the object side to the image side.

In the zoom lenses according to the exemplary embodiments, an aberration variation during an image stabilizing shift is made small.

In the zoom lenses according to the exemplary embodiments, convergence of the last lens unit at the telephoto end on the object side is made weak by optimizing a power (refractive power) of the last lens unit and an amount of movement thereof during zooming. Specifically, Condition (1) is satisfied.

Condition (1) is obtained by deforming a Newton's equation $(XX'=-f^2)$ representing a relationship of a position X' (a distance from a rear principal point) where an image is formed through a lens having a focal length f from an object point distant from a front principal point by a distance X. If the image plane is assumed to be the object point, a distance from the object point to the last lens unit is expressed by X≈bkt−fN and a position where an image is formed by the last lens unit having a focal length fN becomes $X'=fN^2/(bkt-fN)$. Condition (1) is obtained by normalizing them with the focal length fN.

In Condition (1), a positive value means that the object side of the last lens unit (the N-th lens unit) receives a convergent light flux and a negative value means that the object side of the last lens unit receives a divergent light flux, and a large absolute value represents a light flux close to afocal (parallel light flux). Specifically, the object side of the last lens unit has a moderate convergent light by satisfying the range of Condition (1).

If the lower limit of Condition (1) is exceeded, at the telephoto end, the convergence at the last lens unit becomes strong, it becomes difficult to dispose the image stabilizing lens unit in the divergent light flux, and an optical performance during an image stabilizing operation deteriorates. If the upper limit of Condition (1) is exceeded, the positive power of the last lens unit becomes excessively weak, and thus it becomes difficult to miniaturize the entire zoom lens and obtain a wide angle of view. More desirably, Condition (1) can satisfy Condition (1a).

$$1.10 < fN/(bkt-fN) < 1.60 \quad (1a)$$

When a distance from an apex of the lens surface closest to the image side of the last lens unit to the position of the rear principal point of the entire zoom lens is okN, the above-mentioned distance X may be strictly expressed as X=bkt−okN−fN. For this reason, instead of Condition (1) or together with Condition (1), $$1.00 < fN/(bkt-okN-fN) < 3.00 \quad (2)$$

may be desirably satisfied.

The technical significance of Condition (2) is similar to that of Condition (1). More desirably, Condition (2) may satisfy Condition (2a).

$$1.05 < fN/(bkt-okN-fN) < 1.60 \quad (2a)$$

In this case, an amount of movement of the last lens unit during zooming is only limited to make an incidence angle of an axial ray at the telephoto end small, which is not desirable because a basic performance is damaged.

For example, in U.S. Pat. No. 7,889,438, the last lens unit satisfies Condition (1) at the telephoto end and the image stabilizing performance at the telephoto end is excellent, but an amount of movement of the last lens unit during zooming is significantly reduced and it is difficult to maintain the basic performance appropriately.

Thus, in an example invention, the basic performance and the image stabilizing performance at the telephoto end are maintained appropriately by satisfying Condition (3) together with Condition (1). Condition (3) is an expression representing an amount of movement of the last lens unit during zooming. If the lower limit of Condition (3) is exceeded, a zooming effect at the last lens unit is reduced, and the optical performance at the telephoto end deteriorates. Further, if the upper limit is exceeded, the convergence of the last lens unit is excessively strong, and thus the image stabilizing performance at the telephoto end deteriorates. More desirably, Condition (3) may satisfy Condition (3a).

$$0.80 < -mN/fN < 1.10 \quad (3a)$$

In the exemplary embodiments, at least one of the following conditions may be satisfied to maintain the basic performance and the image stabilizing performance at the telephoto end more appropriately. When the focal length of the second lens subunit (N−1)B is referred to as fB, and the block length of the N-th lens unit is referred to as bldN, at least one of the following conditions may be desirably satisfied:

$$0.60 < -fN/fB < 1.60 \quad (4)$$

$$0.05 < bldN/fN < 0.30 \quad (5).$$

Condition (4) is an expression for sufficiently diverging the light flux on the object side of the last lens unit, the convergence of which is weakened by Condition (1), with the second lens subunit (N−1)B toward the first lens subunit (N−1)A. The block length (bldN) is a distance along a lens axis between a first surface of the N-th lens unit farthest from the image plane and a second surface of the N-th lens unit closest to the image plane.

If the lower limit of Condition (4) is exceeded, the power of the second lens subunit (N−1)B becomes weak and a sufficient amount of divergent light flux toward the first lens subunit (N−1)A is not generated. As a result, an incidence height of an axial ray in the second lens subunit (N−1)B of the entire zoom lens becomes large, and an image stabilizing performance at the telephoto end deteriorates. If the upper limit of Condition (4) is exceeded, the divergence of the second lens subunit (N−1)B becomes excessively strong and the entire zoom lens becomes large-sized. More desirably, Condition (4) may satisfy Condition (4a).

$$0.80 < -fN/fB < 1.25 \quad (4a)$$

Condition (5) relates to a block length of the last lens unit (N-th lens unit).

A distance from the image plane to the rear principal point position of the last lens unit may be reduced by shortening the block length of the last lens unit to a degree. As a result, even when the last lens unit is moved to the object side during zooming from the wide-angle end to the telephoto end, an incidence height of the axial ray may be small and it becomes easy to satisfy Conditions (1), (2), and (3).

If the upper limit of Condition (5) is exceeded, the block length increases and a distance from the image plane to the rear principal point position becomes large, and thus it becomes difficult to shorten the incidence height of the axial ray in the last lens unit at the telephoto end. If the lower limit of Condition (5) is exceeded, the last lens unit cannot obtain an activity (function) as a lens unit having a sufficient positive refractive power and it becomes difficult to miniaturize the entire zoom lens and achieve high performance. More desirably, Condition (5) may satisfy Condition (5a).

$$0.08 < bldN/fN < 0.25 \quad (5a)$$

Next, it is more desirable that the zoom lens according to the exemplary embodiments of the present invention includes one or more lens units between the second lens unit and the (N−1)th lens unit. By doing this, high performance can be easily obtained even if the block length of the last lens unit is significantly shortened.

The zoom lens according to the exemplary embodiments of the present invention has a sufficient effect as a four-unit zoom lens including first to fourth lens units having positive, negative, positive, and positive refractive powers in order from the object side. In addition, the zoom lens according to the exemplary embodiments of the present invention may be a five-unit zoom lens including first to fifth lens units having positive, negative, negative, positive, and positive refractive powers in order from the object side. Alternatively, the zoom lens according to the exemplary embodiments of the present invention may be a six-unit zoom lens including first to sixth lens units having positive, negative, positive, negative, positive, and positive refractive powers in order from the object side. In the case of the six-unit zoom lens, if the third lens unit and the fifth lens unit are driven simultaneously during zooming, the number of lens units may be increased by a relatively simple mechanical configuration, which is desirable.

The present invention may be variously applied to an optical apparatus (for example, an image pickup apparatus, an image projection apparatus, or other optical apparatuses) having the above-described optical system.

Some of the differences between an example of the present invention and the above-mentioned Japanese Patent Application Laid-Open No. 2010-271362 and U.S. Patent Application Publication No. 2011/0116174 are as follows. In the four-unit zoom lens of U.S. Patent Application Publication No. 2011/0116174 including first to fourth lens units having positive, negative, positive, and positive refractive powers, a zooming effect is achieved by moving the first lens unit, the third lens unit, and the fourth lens unit toward the object side to a large degree during zooming from the wide-angle end to the telephoto end. First, at the wide-angle end of the four-unit zoom lens including the first to fourth lens units having positive, negative, positive, and positive refractive powers, an axial light flux is ray-traced from the image plane side toward the object side in a direction opposite to a travel direction of the ray, and the feature of the four-unit zoom lens is analyzed.

At the wide-angle end, the principal point position of the entire zoom lens needs to be disposed on the image plane side due to a wide angle of view. For this reason, the fourth lens unit having a positive refractive power is closest to the image side of the lens body. In this state, an incidence height of the axial ray becomes smaller in the fourth lens unit, and thus a contribution of the positive power (refractive power) to the divergent light flux on the image plane does not become large but the ray becomes a light flux whose divergence is slightly moderate at the object side.

Next, a divergence can be strengthened in the negative lens unit on an image side of the third lens unit and an incident height of the most axial ray in both the adjacent lens units at the object side of the third lens unit becomes larger, and thus a convergent ray is present at the strong positive power and travels toward the second lens unit. Thus, the negative lens unit on the image side of the third lens unit, which is an image stabilizing lens unit, is disposed in the divergence of the axial light flux, and thus an incidence height of the axial ray becomes relatively small. For this reason, a variation in coma during an image stabilizing shift may become relatively small.

Next, like the wide-angle end, at the telephoto end, the axial ray is ray-traced from the image plane side toward the object side, and the feature of the four-unit zoom lens is analyzed. At the telephoto end, the third lens unit and the fourth lens unit are moved toward the object side to effectively move the principal point position of the entire zoom lens toward the object side due to telephoto. For this reason, an incidence height of the axial ray in the fourth lens unit becomes large, and the object side has a strong convergent ray.

Next, in a negative lens unit on the image side of the third lens unit close to the object side of the fourth lens unit, the convergent light flux is close to afocal (a parallel light flux), and is converged at both the lens units at the object side of the third lens unit to travel toward the second lens unit. For this reason, an incidence height of the axial ray is always large from the fourth lens unit to a negative lens unit on the image side of the third lens unit, which is an image stabilizing lens unit, and a positive lens unit of the object side of the third lens unit. For this reason, a variation in coma during an image stabilizing shift may become large.

In U.S. Patent Application Publication No. 2011/0116174, a variation in coma during an image stabilizing shift may be lessened by using an aspheric lens. However, a variation of the sagittal image plane still tends to be left.

Next, in the five-unit zoom lens of Japanese Patent Application Laid-Open No. 2010-271362 including first to fifth lens units having positive, negative, positive, negative and positive refractive powers, a reason why it is relatively easy to correct image stabilizing performance is analyzed. At the telephoto end of the five-unit zoom lens of a five-unit zoom type, the third lens unit having a positive refractive power and a fifth lens unit having a positive refractive power are moved toward the object side to move the principal point position of the entire zoom lens toward the object side. Then, the fourth lens unit having a negative refractive power is relatively moved toward the image side with respect to the third lens unit and the fifth lens unit.

For this reason, the amount of movement of the last lens unit of the five-unit zoom lens during zooming becomes smaller than that of the above four-unit zoom lens by a degree by which the fourth lens unit having a negative refractive power is relatively moved toward the image side. Like the above-described four-unit zoom lens, at the telephoto end of the five-unit zoom lens, the axial light flux is ray-traced from the image plane side to the object side, and the feature of the five-unit zoom lens is analyzed. An incidence height of the axial ray becomes large in the fifth lens unit, and the object side of the fifth lens unit receives a moderate convergent light flux.

Next, a divergent light flux is made by the fourth lens unit having a negative refractive power close to the object side of the fifth lens unit, and travels toward the third lens unit positioned at a position spaced apart by a relative amount of movement of the fourth lens unit with respect to the third lens unit. The light flux is then converged by the third lens unit, and travels toward the second lens unit. Thus, the fourth lens unit, which is an image stabilizing lens unit, is disposed in the divergence of the axial light flux, and thus an incidence height of the axial ray becomes relatively small.

For this reason, in the five-unit zoom lens of Japanese Patent Application Laid-Open No. 2010-271362, a variation in coma during an image shift is appropriately corrected as compared with the four-unit zoom lens without using an aspheric lens in an image stabilizing lens unit.

As the zoom lens according to the exemplary embodiments of the present invention is configured as described above, the basic optical performance without performing an image stabilizing operation and the optical performance during an image stabilizing shift are maintained appropriately while the entire zoom lens is small-sized and has a simple configuration.

Hereinafter, configurations of the exemplary embodiments will be described. The zoom lens according to the first exemplary embodiment includes a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, and a sixth lens unit L6 having a positive refractive power in order from the object side to the image side. Further, the lens units are moved during zooming. The first exemplary embodiment corresponds to a six-unit zoom lens having a zoom ratio of 7.0.

The fifth lens unit L5 includes a 5A-th lens unit L5A having a positive refractive power and a 5B-th lens unit L5B having a negative refractive power in order from the object side to the image side, and an image position is displaced by moving the 5B-th lens unit L5B to have a component in a direction perpendicular to the optical axis. Thus, an image stabilizing operation is performed. The fifth lens unit L5 corresponds to the (N−1)th lens unit, the sixth lens unit L6 corresponds to the N-th lens unit, the 5A-th lens unit L5A corresponds to the first lens subunit (N−1)A, and the 5B-th lens unit L5B corresponds to the second lens subunit (N−1)B.

The relationship between the power of the sixth lens unit L6 and the amount of movement during zooming satisfies Conditions (1), (2), and (3). Accordingly, the movement of the sixth lens unit L6 during zooming is not limited, and the object side of the sixth lens unit L6 at the telephoto end receives a moderate convergent light flux. Accordingly, the 5B-th lens unit L5B is disposed in the divergent light flux at the telephoto end such that the optical performance during an image stabilizing operation is maintained appropriately without using an aspheric lens, and a basic optical performance without performing an image stabilizing operation is maintained appropriately. In this case, the relationship between the sixth lens unit L6 and the 5B-th lens unit L5B satisfies Condition (4).

Accordingly, at the telephoto end, as the moderate convergent light flux in the sixth lens unit L6 becomes a sufficient divergent light flux in the 5B-th lens unit L5B, an incidence height h of the axial ray in the 5B-th lens unit L5B with respect to the 5A-th lens unit L5A is made sufficiently small. In this case, as the block length (the length from a lens surface of the object side to a lens surface of the image side) of the sixth lens unit L6 satisfies Condition (5), a distance from the image plane to the rear principal point of the sixth lens unit L6 becomes short, making it easy to satisfy Conditions (1), (2), and (3).

Further, in the first exemplary embodiment, as the number of lenses of the sixth lens unit L6 is one and the block length is sufficiently small, an aberration variation during zooming is corrected by moving the third lens unit L3 and the fourth lens unit L4. In this case, the third lens unit L3 and the fifth lens unit L5 are moved simultaneously during zooming, and thus the mechanical structure thereof has a relatively simple configuration.

Next, the zoom lens according to the second exemplary embodiment includes a first lens unit L1 having a positive refractive power, a second lens unit L2 having a negative refractive power, a third lens unit L3 having a positive refractive power, and a fourth lens unit L4 having a positive refractive power in order from the object side to the image side. The lens units are moved during zooming. The second exemplary embodiment corresponds to a four-unit zoom lens having a zoom ratio of 7.0. The third lens unit L3 includes a 3A-th lens unit L3A having a positive refractive power and a 3B-th lens unit L3B having a negative refractive power in order from the object side to the image side, and an image position is displaced by moving the 3B-th lens unit L3B to have a component in a direction perpendicular to the optical axis.

The third lens unit L3 corresponds to the (N−1)th lens unit, the fourth lens unit L4 corresponds to the N-th lens unit, the 3A-th lens unit L3A corresponds to the first lens subunit (N−1)A, and the 3B-th lens unit L3B corresponds to the second lens subunit (N−1)B. The relationship between the power of the fourth lens unit L4 and the amount of movement during zooming satisfies Conditions (1), (2), and (3). Accordingly, the movement of the fourth lens unit L4 during zooming is not limited, and the object side of the fourth lens unit L4 at the telephoto end receives a moderate convergent light flux.

Accordingly, the 3B-th lens unit L3B is disposed in the divergent light flux at the telephoto end such that the optical performance during an image stabilizing operation is maintained appropriately without using an aspheric lens, and a basic optical performance without an image stabilizing operation is maintained appropriately. In this case, the relationship between the fourth lens unit L4 and the 3B-th lens unit L3B satisfies Condition (4). Accordingly, at the telephoto end, as the moderate convergent light flux in the fourth lens unit L4 becomes a sufficient divergent light flux in the 3B-th lens unit L3B, an incidence height of the axial ray in the 3B-th lens unit L3B becomes sufficiently smaller than that of the 3A-th lens unit L3A.

In this case, as the block length of the fourth lens unit L4 satisfies Condition (5), a distance from the image plane to the rear principal point of the fourth lens unit L4 becomes short, making it easy to satisfy Conditions (1), (2), and (3).

The zoom lens according to the third exemplary embodiment includes a first lens unit L1 having a positive refractive power, a second lens unit L2 having a negative refractive power, a third lens unit L3 having a negative refractive power, a fourth lens unit L4 having a positive refractive power, and a fifth lens unit L5 having a positive refractive power in order from the object side to the image side. The lens units are moved during zooming. The third exemplary embodiment corresponds to a fifth-unit zoom lens having a zoom ratio of 7.0. The fourth lens unit L4 includes a 4A-th lens unit L4A having a positive refractive power and a 4B-th lens unit L4B having a negative refractive power in order from the object side to the image side, and an image position is displaced by moving the 4B-th lens unit L4B to have a component in a direction perpendicular to the optical axis.

The fourth lens unit L4 corresponds to the (N−1)th lens unit, the fifth lens unit L5 corresponds to the N-th lens unit, the 4A-th lens unit L4A corresponds to the first lens subunit (N−1)A, and the 4B-th lens unit L4B corresponds to the second lens subunit (N−1)B. The relationship between the power of the fifth lens unit L5 and the amount of movement during zooming satisfies Conditions (1), (2), and (3). Accordingly, the movement of the fifth lens unit L5 during zooming is not limited, and the object side of the fifth lens unit L5 at the telephoto end receives a moderate convergent light flux.

Accordingly, the 4B-th lens unit L4B is disposed in the divergent light flux at the telephoto end such that the optical performance during an image stabilizing operation is maintained appropriately without using an aspheric lens, and an optical performance at a basic operation not performing an image stabilizing operation is maintained appropriately. In this case, the relationship between the fifth lens unit L5 and the 4B-th lens unit L4B satisfies Condition (4). Accordingly, at the telephoto end, as the moderate convergent light flux in the fifth lens unit L5 becomes a sufficient divergent light flux in the 4B-th lens unit L4B, and an incidence height h of the axial ray in the 4B-th lens unit L4B becomes sufficiently smaller than that of the 4A-th lens unit L4A.

In this case, as the block length of the fifth lens unit L5 satisfies Condition (5), a distance from the image plane to the rear principal point of the fifth lens unit L5 becomes short, making it easy to satisfy Conditions (1), (2), and (3). Further, in the third exemplary embodiment, as the number of lenses of the fifth lens unit L5 is two and the convex length is sufficiently small, an aberration variation during zooming is corrected by moving the third lens unit L3.

The zoom lens according to the fourth exemplary embodiment includes a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, and a sixth lens unit L6 having a positive refractive power in order from the object side to the image side. Further, the lens units are moved during zooming. The fourth exemplary embodiment corresponds to a six-unit zoom lens having a zoom ratio of 7.0.

The fifth lens unit L5 includes a 5A-th lens unit L5A having a positive refractive power and a 5B-th lens unit L5B having a negative refractive power in order from the object side to the image side, and an image position is displaced by moving the 5B-th lens unit L5B to have a component in a direction perpendicular to the optical axis. The fifth lens unit L5 corresponds to the (N−1)th lens unit, the sixth lens unit L6 corresponds to the N-th lens unit, the 5A-th lens unit L5A corresponds to the first lens subunit (N−1)A, and the 5B-th lens unit L5B corresponds to the second lens subunit (N−1)B.

Like in the first exemplary embodiment, the lens units satisfy the conditions. The other configurations are substantially the same as in the first exemplary embodiment. Hitherto, although the optical systems according to the exemplary embodiments of the present invention have been described, the present invention is not limited to the exemplary embodiments but may be variously modified and changed without departing from the scope of the present invention.

Next, an exemplary embodiment of a digital still camera using the zoom lens according to the exemplary embodiments of the present invention as a photographic optical system will be described with reference to FIG. 17. FIG. 17 illustrates a camera body 20 and a photographic optical system 21 including any one of the zoom lenses described in the first to fourth exemplary embodiments. A solid-state image sensor (photoelectric conversion element) 22 such as a CCD sensor or a CMOS sensor is mounted in the camera body and configured to receive an object image formed by the photographic optical system 21.

The advantages described in the first to fourth exemplary embodiments are effectively used in the image pickup apparatus as described in the exemplary embodiments. The zoom lens according to the exemplary embodiments of the present invention may be variously applied to an optical apparatus (for example, an image pickup apparatus, an image projection apparatus, or other optical apparatuses) having the above-described optical system. Further, the present invention may also be applied to a mirror-less single-lens reflex camera having no quick-return mirror.

Hereinafter, Numerical Examples 1 to 4 corresponding to the first to fourth exemplary embodiments will be described. In Numerical Examples, an order of a surface from the object side is denoted by i. In Numerical Examples, a radius of curvature of the i-th lens surface in order from the object side is denoted by ri, the i-th lens thickness or air distance in order from the object side is denoted by di, and a refractive index and Abbe number of a material of the i-th lens in order from the object side are denoted by ndi and vdi, respectively. A back focus is denoted by BF. The aspheric shape is given in the following equation when a paraxial radius of curvature is denoted by r, and aspheric coefficients are A4, A6, A8, A10, and A12 while taking the optical axis direction as the X-axis, the direction perpendicular to the optical axis as the H-axis, and a traveling direction of light as positive:

$$X = \frac{H^2/r}{1+(1-(H/r)^2)^{1/2}} + A4 \cdot H^4 + A6 \cdot H^6 + A8 \cdot H^8 + A10 \cdot H^{10} + A12 \cdot H^{12}$$

In the aspheric coefficients, "e-x" means "$10^{-x}$". Further, with specifications such as a focal length and an F-number, an angle of view is a half angle of view of the entire zoom lens, an image height is a maximum image height for determining the half angle of view, and the total lens length is a distance from the first lens surface to the image plane. The back focus BF represents a length from the last lens surface to the image plane.

Further, the portion where the distance d between the optical surfaces is variable is changed during zooming, and the surface distances corresponding to the focal lengths are written in a separate table. In addition, a performance during an image stabilizing operation is a performance during an image stabilizing shift of 0.3 degrees, and indicates a performance obtained when an image stabilizing lens unit is shifted until a ray inversely traced on an optical axis of an infinitely-distant object point is shifted by $\Delta Y = f \cdot \tan 0.3°$ from the optical axis on the image plane.

Moreover, the calculation results of the conditions based on the lens data of Numerical Examples 1 to 4 described below are illustrated in Table 1. Surface number 1 denotes a dummy surface used in design. The dummy surface does not constitute a zoom lens.

NUMERICAL EXAMPLE 1

| Surface Data | | | | | |
|---|---|---|---|---|---|
| Surface Number | r | d | nd | vd | Effective Diameter |
| 1 | ∞ | 1.50 | | | 58.97 |
| 2 | 103.224 | 1.90 | 1.84666 | 23.8 | 51.40 |
| 3 | 58.098 | 7.55 | 1.49700 | 81.5 | 49.88 |
| 4 | −2051.183 | 0.15 | | | 49.47 |
| 5 | 51.518 | 6.01 | 1.60311 | 60.6 | 47.33 |
| 6 | 221.202 | (variable) | | | 46.45 |
| 7 | 154.011 | 1.45 | 1.83481 | 42.7 | 30.14 |
| 8 | 14.946 | 6.97 | | | 22.73 |
| 9 | −51.882 | 1.20 | 1.77250 | 49.6 | 22.45 |
| 10 | 52.290 | 0.49 | | | 22.06 |
| 11 | 28.363 | 5.72 | 1.84666 | 23.8 | 22.30 |
| 12 | −56.488 | 1.10 | 1.77250 | 49.6 | 21.56 |
| 13 | 86.526 | (variable) | | | 20.62 |
| 14 | 72.250 | 1.90 | 1.80518 | 25.4 | 13.42 |
| 15 | −56.079 | (variable) | | | 13.47 |
| 16 | −31.540 | 0.70 | 1.90366 | 31.3 | 13.18 |
| 17 | 215.040 | (variable) | | | 13.46 |
| 18 | 28.125 | 3.40 | 1.60311 | 60.6 | 14.70 |
| 19 | −43.105 | 0.87 | | | 14.66 |
| 20(Stop) | ∞ | 3.30 | | | 14.29 |
| 21 | 23.236 | 4.93 | 1.60311 | 60.6 | 13.74 |
| 22 | −21.035 | 0.75 | 1.84666 | 23.8 | 12.86 |
| 23 | 61.514 | 2.87 | | | 12.49 |
| 24 | −199.029 | 0.70 | 1.74950 | 35.3 | 12.12 |
| 25 | 12.467 | 2.72 | 1.84666 | 23.8 | 12.01 |
| 26 | 30.161 | (variable) | | | 11.85 |
| 27* | 47.064 | 3.76 | 1.59551 | 39.2 | 15.02 |
| 28 | −41.115 | | | | 15.81 |

| Aspheric data Twenty-seventh surface | | |
|---|---|---|
| K = 0.00000e+000 | A4 = −3.04541e−005 | A6 = −3.29821e−008 |
| A8 = 3.85823e−010 | A10 = −1.56009e−011 | A12 = 1.29003e−013 |

| Data Zoom ratio 7.02 | | | |
|---|---|---|---|
| | Wide Angle | Middle | Telephoto |
| Focal Length | 18.60 | 50.08 | 130.50 |
| F-number | 3.59 | 4.90 | 5.88 |
| Angle of View | 36.29 | 15.26 | 5.98 |
| Image Height | 13.66 | 13.66 | 13.66 |
| Total Lens length | 134.40 | 154.67 | 183.86 |
| BF | 35.60 | 55.56 | 69.41 |
| d6 | 0.90 | 21.35 | 42.10 |
| d13 | 23.50 | 5.99 | 1.50 |
| d15 | 2.53 | 3.87 | 8.16 |
| d17 | 7.01 | 5.67 | 1.38 |
| d26 | 4.92 | 2.30 | 1.38 |

NUMERICAL EXAMPLE 2

| Surface Data | | | | | |
|---|---|---|---|---|---|
| Surface Number | r | d | nd | vd | Effective Diameter |
| 1 | ∞ | 1.50 | | | 61.27 |
| 2 | 60.397 | 1.90 | 1.84666 | 23.8 | 51.33 |
| 3 | 46.050 | 8.43 | 1.49700 | 81.5 | 48.96 |
| 4 | 760.714 | 0.15 | | | 47.85 |
| 5 | 61.677 | 3.89 | 1.60311 | 60.6 | 44.17 |
| 6 | 148.503 | (variable) | | | 43.01 |
| 7* | 316.872 | 1.45 | 1.91082 | 35.3 | 27.68 |
| 8 | 14.154 | 6.67 | | | 20.99 |
| 9 | −41.118 | 1.20 | 1.77250 | 49.6 | 20.68 |
| 10 | 57.620 | 0.15 | | | 20.62 |
| 11 | 30.380 | 5.77 | 1.84666 | 23.8 | 20.90 |
| 12 | −33.928 | 1.10 | 1.83481 | 42.7 | 20.43 |
| 13 | 376.625 | (variable) | | | 19.86 |
| 14 | 27.952 | 3.38 | 1.51633 | 64.1 | 14.97 |
| 15 | −49.591 | 0.94 | | | 14.85 |
| 16(Stop) | ∞ | 2.00 | | | 14.29 |
| 17 | 21.374 | 4.31 | 1.58313 | 59.4 | 14.13 |
| 18 | −31.022 | 0.75 | 1.90366 | 31.3 | 13.45 |
| 19 | 75.168 | 2.86 | | | 13.17 |
| 20 | −118.381 | 0.70 | 1.72047 | 34.7 | 12.82 |
| 21 | 13.742 | 2.47 | 1.84666 | 23.8 | 12.73 |
| 22 | 34.835 | (variable) | | | 12.58 |
| 23* | 59.313 | 1.00 | 1.71736 | 29.5 | 14.99 |

-continued

| | | | | | |
|---|---|---|---|---|---|
| 24 | 18.971 | 5.55 | 1.56384 | 60.7 | 15.57 |
| 25 | −27.138 | | | | 16.61 |

Aspheric data

Seventh surface

K = 0.00000e+000  A4 = 3.29163e−006  A6 = 2.18787e−009
A8 = −6.58428e−011  A10 = 2.59270e−013  A12 = −3.36330e−016

Twenty-third surface

K = 0.00000e+000  A4 = −2.54766e−005  A6 = 6.10113e−008
A8 = −3.02456e−009  A10 = 4.90159e−011  A12 = −2.85457e−013

Data
Zoom ratio 7.02

| | Wide Angle | Middle | Telephoto |
|---|---|---|---|
| Focal Length | 18.60 | 50.00 | 130.50 |
| F-number | 3.50 | 4.67 | 5.88 |
| Angle of View | 36.29 | 15.28 | 5.98 |
| Image Height | 13.66 | 13.66 | 13.66 |
| Total Lens length | 128.08 | 150.40 | 176.15 |
| BF | 36.92 | 56.52 | 75.01 |
| d6 | 2.49 | 24.08 | 42.10 |
| d13 | 26.76 | 11.09 | 1.57 |
| d22 | 5.74 | 2.53 | 1.30 |

NUMERICAL EXAMPLE 3

Surface Data

| Surface Number | r | d | nd | vd | Effective Diameter |
|---|---|---|---|---|---|
| 1 | ∞ | 1.50 | | | 65.46 |
| 2 | 69.700 | 1.90 | 1.84666 | 23.8 | 54.57 |
| 3 | 48.775 | 7.96 | 1.49700 | 81.5 | 51.09 |
| 4 | 462.253 | 0.15 | | | 50.31 |
| 5 | 52.111 | 5.91 | 1.60311 | 60.6 | 47.23 |
| 6 | 226.349 | (variable) | | | 46.38 |
| 7* | 123.557 | 1.45 | 1.91082 | 35.3 | 31.64 |
| 8 | 14.579 | 7.19 | | | 23.30 |
| 9 | −75.393 | 1.20 | 1.77250 | 49.6 | 23.05 |
| 10 | 34.828 | 0.88 | | | 22.53 |
| 11 | 24.435 | 6.31 | 1.84666 | 23.8 | 23.11 |
| 12 | −62.343 | 1.10 | 1.72000 | 50.2 | 22.33 |
| 13 | 57.409 | (variable) | | | 21.16 |
| 14 | 22.065 | 2.39 | 1.76182 | 26.5 | 15.33 |
| 15 | 201.321 | 3.88 | | | 14.97 |
| 16 | −41.551 | 0.70 | 1.90366 | 31.3 | 14.01 |
| 17 | 35.342 | (variable) | | | 14.12 |
| 18 | 26.011 | 3.69 | 1.60311 | 60.6 | 15.58 |
| 19 | −39.299 | 0.75 | | | 15.49 |
| 20(Stop) | ∞ | 2.00 | | | 15.17 |
| 21 | 17.922 | 4.83 | 1.51633 | 64.1 | 14.71 |
| 22 | −27.038 | 0.75 | 1.84666 | 23.8 | 13.81 |
| 23 | 54.563 | 2.78 | | | 13.38 |
| 24 | 797.082 | 0.70 | 1.80000 | 29.8 | 12.98 |
| 25 | 11.977 | 2.66 | 1.84666 | 23.8 | 12.76 |
| 26 | 33.047 | (variable) | | | 12.59 |
| 27* | 31.419 | 7.06 | 1.58144 | 40.8 | 14.27 |
| 28 | −12.748 | 1.00 | 1.63854 | 55.4 | 14.94 |
| 29 | −60.570 | | | | 15.79 |

Aspheric data

Seventh surface

K = 0.00000e+000  A4 = −6.18475e−007  A6 = 1.01160e−008
A8 = −6.15050e−011  A10 = 1.48460e−013  A12 = −1.35475e−016

Twenty-seventh surface

K = 0.00000e+000  A4 = −4.79803e−005  A6 = 2.14079e−008
A8 = −2.84250e−009  A10 = 5.95160e−011  A12 = −4.77526e−013

Data
Zoom ratio 6.99

| | Wide Angle | Middle | Telephoto |
|---|---|---|---|
| Focal Length | 18.63 | 51.00 | 130.31 |
| F-number | 3.56 | 5.00 | 5.88 |
| Angle of View | 36.25 | 14.99 | 5.98 |
| Image Height | 13.66 | 13.66 | 13.66 |
| Total Lens length | 138.18 | 161.27 | 187.59 |
| BF | 35.75 | 57.90 | 71.11 |
| d6 | 0.90 | 19.27 | 37.62 |
| d13 | 22.19 | 7.79 | 7.03 |
| d17 | 8.29 | 6.16 | 1.78 |
| d26 | 2.32 | 1.41 | 1.30 |

NUMERICAL EXAMPLE 4

Surface Data

| Surface Number | r | d | nd | vd | Effective Diameter |
|---|---|---|---|---|---|
| 1 | ∞ | 1.50 | | | 59.01 |
| 2 | 107.732 | 1.90 | 1.84666 | 23.8 | 52.25 |
| 3 | 60.391 | 7.57 | 1.49700 | 81.5 | 50.77 |
| 4 | −1239.687 | 0.15 | | | 50.45 |
| 5 | 53.128 | 6.09 | 1.60311 | 60.6 | 48.38 |
| 6 | 238.329 | (variable) | | | 47.56 |
| 7 | 164.319 | 1.45 | 1.83481 | 42.7 | 30.19 |
| 8 | 15.295 | 6.85 | | | 22.89 |
| 9 | −53.790 | 1.20 | 1.77250 | 49.6 | 22.60 |
| 10 | 50.684 | 0.88 | | | 22.14 |
| 11 | 29.817 | 5.57 | 1.84666 | 23.8 | 22.37 |
| 12 | −59.549 | 1.10 | 1.77250 | 49.6 | 21.65 |
| 13 | 91.992 | (variable) | | | 20.77 |
| 14 | 57.606 | 1.95 | 1.80518 | 25.4 | 14.14 |
| 15 | −73.234 | (variable) | | | 14.18 |
| 16 | −35.671 | 0.70 | 1.90366 | 31.3 | 13.67 |
| 17 | 150.440 | (variable) | | | 13.92 |
| 18 | 30.381 | 3.40 | 1.60311 | 60.6 | 15.02 |
| 19 | −41.483 | 0.83 | | | 14.95 |
| 20(Stop) | ∞ | 3.30 | | | 14.52 |
| 21 | 25.373 | 4.95 | 1.60311 | 60.6 | 14.26 |
| 22 | −21.035 | 0.75 | 1.84666 | 23.8 | 13.48 |
| 23 | 86.598 | 3.56 | | | 13.18 |
| 24 | −136.978 | 0.70 | 1.74950 | 35.3 | 12.81 |
| 25 | 12.387 | 2.58 | 1.84666 | 23.8 | 12.87 |
| 26 | 30.397 | (variable) | | | 12.84 |
| 27* | 47.113 | 1.00 | 1.72151 | 29.2 | 15.43 |
| 28 | 31.941 | 3.58 | 1.59551 | 39.2 | 15.84 |
| 29 | −38.622 | | | | 16.43 |

Aspheric data

Twenty-seventh surface

K = 0.00000e+000  A4 = −2.10453e−005  A6 = −4.04601e−008
A8 = 9.66019e−010  A10 = −2.17624e−011  A12 = 1.50968e−013

-continued

Data
Zoom ratio 7.02

|  | Wide Angle | Middle | Telephoto |
|---|---|---|---|
| Focal Length | 18.60 | 50.99 | 130.48 |
| F-number | 3.59 | 4.88 | 5.97 |
| Angle of View | 36.30 | 15.00 | 5.98 |
| Image Height | 13.66 | 13.66 | 13.66 |
| Total Lens length | 138.05 | 159.04 | 187.49 |
| BF | 35.60 | 55.89 | 71.70 |
| d6 | 0.90 | 22.59 | 42.10 |
| d13 | 25.44 | 7.28 | 1.50 |
| d15 | 2.65 | 4.09 | 7.85 |
| d17 | 6.67 | 5.23 | 1.47 |
| d26 | 5.22 | 2.39 | 1.30 |

TABLE 1

|  | Numerical Example 1 | Numerical Example 2 | Numerical Example 3 | Numerical Example 4 |
|---|---|---|---|---|
| Lens Type | PNPNPP | PNPP | PNNPP | PNPNPP |
| fw | 18.600 | 18.600 | 18.633 | 18.600 |
| ft | 130.500 | 130.500 | 130.309 | 130.480 |
| fN | 37.450 | 41.000 | 41.710 | 38.030 |
| okN | −1.117 | −0.879 | −3.814 | −1.311 |
| fB | −41.827 | −47.295 | −48.707 | −39.321 |
| bkt | 69.410 | 75.004 | 71.110 | 71.700 |
| mN | −33.810 | −38.082 | −35.405 | −36.100 |
| bldN | 3.760 | 6.550 | 8.064 | 4.580 |
| Condition (1) | 1.172 | 1.206 | 1.419 | 1.129 |
| Condition (2) | 1.132 | 1.175 | 1.256 | 1.087 |
| Condition (3) | 0.903 | 0.929 | 0.849 | 0.949 |
| Condition (4) | 0.895 | 0.867 | 0.856 | 0.967 |
| Condition (5) | 0.100 | 0.160 | 0.193 | 0.120 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-220910 filed Oct. 5, 2011, which is hereby incorporated by reference herein in its entirety.

What is claimed is:

1. A zoom lens comprising N lens units including a first lens unit having a positive refractive power and a second lens unit having a negative refractive power in order from an object side to an image side, wherein each lens unit is moved to effect zooming, wherein an (N−1)th lens unit and an N-th lens unit, counted from the object side, have positive refractive powers,
  wherein the (N−1)th lens unit includes a first lens subunit having a positive refractive power and a second lens subunit having a negative refractive power in order from the object side to the image side, wherein the second lens subunit is moved to have a component in a direction perpendicular to an optical axis to move an image position,
  wherein one or more lens units are disposed between the second lens unit and the (N−1)th lens unit, and
  wherein at least one lens unit among one or more lens units arranged between the second lens unit and the (N−1)th lens unit is/are a lens unit which moves during a focusing operation,
  wherein, when a focal length of the N-th lens unit is fN, a back focus at a telephoto end is bkt, an amount of movement of the N-th lens unit during zooming from a wide-angle end to the telephoto end is mN, and a sign of the amount of movement is positive when the N-th lens unit is moved from the object side to the image side, following conditions are satisfied:

$$1.05 < fN/(bkt-fN) < 3.00$$

$$0.65 < -mN/fN < 1.50.$$

2. The zoom lens according to claim 1, wherein, when a focal length of the second lens subunit is fB, following condition is satisfied:

$$0.60 < -fN/fB < 1.60.$$

3. The zoom lens according to claim 1, wherein, when a distance from an apex of a lens surface closest to the image side of the N-th lens unit to a rear principal point position of the zoom lens is okN, following condition is satisfied:

$$1.00 < fN/(bkt-okN-fN) < 3.00.$$

4. The zoom lens according to claim 1, wherein the zoom lens consists of a first lens unit having a positive refractive power, a second lens unit having a negative refractive power, a third lens unit having a positive refractive power, a fourth lens unit having a negative refractive power, a fifth lens unit having a positive refractive power, and a sixth lens unit having a positive refractive power in order from the object side to the image side.

5. The zoom lens according to claim 1, wherein the zoom lens consists of a first lens unit having a positive refractive power, a second lens unit having a negative refractive power, a third lens unit having a negative refractive power, a fourth lens unit having a positive refractive power and a fifth lens unit having a positive refractive power in order from the object side to the image side.

6. The zoom lens according to claim 1, wherein a lens unit which moves during a focusing operation has negative refractive power.

7. The zoom lens according to claim 1, wherein, when a block length of the N-th lens unit is bldN, following condition is satisfied:

$$0.05 < bldN/fN < 0.30.$$

8. An image pickup apparatus comprising:
a zoom lens; and
a solid state image sensor configured to receive an image formed by the zoom lens,
  wherein the zoom lens comprises N lens units including a first lens unit having a positive refractive power and a second lens unit having a negative refractive power in order from an object side to an image side, wherein each lens unit is moved to effect zooming, wherein an (N−1)th lens unit and an N-th lens unit, counted from the object side, have positive refractive powers,
  wherein the (N−1)th lens unit includes a first lens subunit having a positive refractive power and a second lens subunit having a negative refractive power in order from the object side to the image side, wherein the second lens subunit is moved to have a component in a direction perpendicular to an optical axis to move an image position, wherein one or more lens units are disposed between the second lens unit and the (N−1)th lens unit, and wherein at least one lens unit among one or more lens units arranged between the second lens unit and the (N−1)th lens unit is/are a lens unit which moves during a focusing operation, wherein, when a focal length of the N-th lens unit is fN, a back focus at a telephoto end is bkt, an amount of movement of the N-th lens unit during zooming from a wide-angle end to the telephoto end is mN, and a sign of the amount of movement is positive when the N-th lens unit is moved from the object side to the image side, following conditions are satisfied:

$1.05 < fN/(bkt-fN) < 3.00$ $0.65 < -mN/fN < 1.50.$

* * * * *